US008598070B1

(12) United States Patent  
Baugh et al.

(10) Patent No.: US 8,598,070 B1  
(45) Date of Patent: Dec. 3, 2013

(54) CARBON DIOXIDE SORBENTS

(71) Applicant: ExxonMobil Research and Engineering Company, Annandale, NJ (US)

(72) Inventors: Lisa S. Baugh, Ringoes, NJ (US); David C. Calabro, Bridgewater, NJ (US); Quanchang Li, Dayton, NJ (US); Enock Berluche, Phillipsburg, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 13/896,907

(22) Filed: May 17, 2013

Related U.S. Application Data

(62) Division of application No. 12/973,562, filed on Dec. 20, 2010, now Pat. No. 8,470,074.

(60) Provisional application No. 61/284,645, filed on Dec. 22, 2009.

(51) Int. Cl.  
*B01J 20/00* (2006.01)  
*B01J 20/22* (2006.01)

(52) U.S. Cl.  
USPC ............................ 502/407; 502/400; 502/401

(58) Field of Classification Search  
USPC .............. 423/220, 228, 230, 437.1; 502/400, 502/401, 407; 95/51, 90, 139, 236  
See application file for complete search history.

(56) References Cited

U.S. PATENT DOCUMENTS

| | | | |
|---|---|---|---|
| 4,046,529 A | 9/1977 | Fletcher et al. | |
| 4,111,036 A | 9/1978 | Frechette et al. | |
| 4,405,580 A | 9/1983 | Stogryn et al. | |
| 4,483,833 A | 11/1984 | Stogryn et al. | |
| 5,087,597 A | 2/1992 | Leal et al. | |
| 5,186,727 A | 2/1993 | Chang | |
| 5,281,254 A | 1/1994 | Birbara et al. | |
| 5,432,000 A | 7/1995 | Young, Sr. et al. | |
| 5,492,683 A | 2/1996 | Birbara et al. | |
| 5,626,761 A | 5/1997 | Howery et al. | |
| 6,419,725 B1 | 7/2002 | Laverty et al. | |
| 2002/0014154 A1 | 2/2002 | Witzko et al. | |
| 2006/0173431 A1 | 8/2006 | Laumer et al. | |
| 2007/0022877 A1* | 2/2007 | Marand et al. ............... 95/51 |

(Continued)

FOREIGN PATENT DOCUMENTS

| GB | 1283822 | 7/1970 |
|---|---|---|
| WO | 2008147623 | 12/2008 |

OTHER PUBLICATIONS

Todd W. Pechar, Michael Tsapatsis, Eva Marand, Richie Davis; "Preparation and characterization of a glassy fluorinated polyimide zeolite-mixed matrix mebrane," Desalination 146 (2002) pp. 3-9.

(Continued)

*Primary Examiner* — Anthony J Zimmer  
(74) *Attorney, Agent, or Firm* — David M. Weisberg; Bruce M. Bordelon

(57) ABSTRACT

Improved $CO_2$ sorbents comprised of a mesoporous silica functionalized with a polyamine are obtained by the in-situ polymerization of azetidine. Also included herein are processes utilizing the improved $CO_2$ sorbents wherein $CO_2$ is chemisorbed onto the polyamine portion of the sorbent and the process is thermally reversible.

7 Claims, 9 Drawing Sheets

(56) References Cited

U.S. PATENT DOCUMENTS

| | | |
|---|---|---|
| 2007/0149398 A1 | 6/2007 | Jones et al. |
| 2008/0017578 A1 | 1/2008 | Childs et al. |
| 2008/0039538 A1 | 2/2008 | Olah et al. |
| 2008/0114129 A1 | 5/2008 | Herfert et al. |
| 2008/0145721 A1 | 6/2008 | Shapiro et al. |
| 2008/0264254 A1 | 10/2008 | Song et al. |
| 2009/0028767 A1 | 1/2009 | Parker et al. |

OTHER PUBLICATIONS

Xiaochun Xu, Chunshan Song, John M. Andresen, Brce G. Miller, Alan W. Scaroni; "Preparation and characterization of novel CO2 "molecular basket" adsorbents based on polymer-modified mesoporous molecular sieve MCM-41." Microporous and Mesoporous Materials 62 (2003) pp. 29-45.

Xiaochun Xu, Chunshan Song, John M. Andresen, Bruce G. Miller, Alan W. Scaroni; "Novel POlyethylenimine-Modified Mesoporous Molecular Sieve of MCM-41 Type as igh-Capacity Adsorbent for CO2 Capture," Energy & Fuels 2002, 15, pp. 1463-1469.

Sunita Satyapal, Tom Filburn, John Trela, Jeremy Strange; "Performance and Properties of a Solid Amine Sorbent for Carbon Dioxide Removal in Space Life Support Applications," Energy & Fuels, 2001, 15, pp. 250-255.

Eoghan P. Dillon, Christopher A. Crouse, Andrew R. Barron; "Synthesis, Characterization, and Carbon Dioxide Adsorption of Covalently Attached Polyethyleneimine-Functionalized Single-Wall Carbon Nanotubes," ACS Nano, vol. 2, No. 1, pp. 156-164.

Sangil Kim, Junichi Ida, Vadi V. Guliants, Jerry Y. S. Lin; "Tailoring Pore Properties of MCM-48 Silica for Selective Adsorption of CO2," J. Phys. Chem. B 2005, 109, pp. 6287-6293.

Jessica M. Rosenhlm, Mika Linden;"Wet-Chemical Analysis of Surface Concentration of Accessible Groups on Different Amino-Functionalized Mesoporous SBA-15 Silicas," Chem. Mater. 2007, 19, pp. 5023-5034.

Jessica M. Rosenholm, Antti Penninkangas, Mika Linden; "Amino-functionalization of large-pore mesoscopically ordered silica by a one-step hyperbranching polymerization of a surface-grown polyethyleneimine," Chem. Commun., 2006, pp. 3909-3911.

Takeo Saegusa, Yoshitomi Nagura, Shiro Kobayashi; "Isomerization Polymerication of 1,3-Oxazine. I. Polymerization of Unsubstituted 5,6-Dihydro-4H-1,3-oxazine Giving Poly(N-formyltrimethylenimine) and Its Alkaline Hydrolysis to Poly(trimethylenimine)," Macromolecules, 1973, 6, pp. 495-498.

Xiaochun Xu, John M. Andresen, Chunshan Song, Bruce G. Miller, Alan W. Scaroni; "Preparation of Novel CO2 "Molecular Basket" of POlymer Modified MCM-41," Fuel Chemistry Division Preprints 2002, 47(1), 67-68.

Ming B. Yue, Yuan Chun, Yi Cao, Xin Dong, Jian H. Zhu; CO2 Capture by As-Prepared SA-15 with an Occluded Organic Template, Adv. Funct. Mater.. 2006, 16, pp. 1717-1722.

Etienne H. Schacht, Eric J. Goethals; "Cationic Polymerization of Cyclic Amines, 3," Die Makromolekulare Chemie, 175, (1974), pp. 3447-3459.

E. J. Goethals, E. H. Schacht, Y. E. Bog, S. I. Ali, Y. Tezuka; "The Polymerization of Azetidines and Azetid . . . ," Polymer Journal, vol. 12, No. 9, (1980) pp. 571-581.

D. A. Tomalia, G. R. Killat; "Alkyleneimine Polymers," In Encyclopedia of Polymer Science and Engineering, Kroschwitz, J. I., Mark, H. F., Bikales, N. M., Overberger, C. G., Henges, G., Eds.; Wiley-Interscience: New York, 1985; vol. 1, pp. 680-739.

Jeffrey H. Drese, Sunho Choi, Ryan P. Lively, William Ju. Koros, Daniel J. Fauth, McMahon L. Gray, Christopher W. Jones; "Synthesis-Structure-Property Relationships for Hydrobranched Aminosilica CO2 Adsorbents," Adv. Funct. Mater. 2009 19, pp. 3821-3832.

Hu Liu, Xiaoxi Hu, Yingxi Wang, Xiaoqin Li, Changfeng Yi, Zushun Xu, "Preparation of Monodisperse Nanoparticles Containing Poly(propylene imine)(NH2)32-Polystyrene," Journal of Polymer Science: Part A: Polymer Chemistry, vol. 47, 2892-2904 (2009).

Seiichi Furumi, Akira Otomo, Shiyoshi Yokoyama, Shinro Mashiko, "Photochemical and photophysical reactions of poly(propylene imine) dendrimers tethering cinnamamide groups," Polymer 50 (2009) 2944-2952.

Jason C. Hicks, Jeffrey H. Drese, Daniel J. Fauth, McMahan L. Gray, Genggeng Qi, Christopher W. Jones, "Designing Adsorbents for CO2 Capture from Flue Gas-Hyperbranched Aminosilicas Capable of Capturing CO2 Reversibly," J. Am. Chem. Soc. 2008, 130, 2902-2903.

International Search Report of PCT/US2010/61446 dated Mar. 16, 2011.

\* cited by examiner

35°C, 85°C, and 100°C $CO_2$ Isotherms for Materials of Examples 1 and C1

35°C and 55°C $CO_2$ Isotherms for Materials of Examples 6 and C2

85°C and 100°C $CO_2$ Isotherms for Materials of Examples 6 and C2

Expansion View of the 1 to 100 mm Hg portion of the 35°C $CO_2$ Isotherm shown in Figure 5a $^{13}$C NMR for the Aqueous Poly(aziridine) ("PEI") Solution of Example C3 before (Fig. 8a, 24°C) and after (Fig. 8b, 24°C) Treatment with $CO_2$

CARBON DIOXIDE SORBENTS

CROSS-REFERENCE TO RELATED APPLICATIONS

This application is a divisional application of U.S. Ser. No. 12/973,562 filed Dec. 20, 2010, which claims priority to U.S. Ser. No. 61/284,645 filed Dec. 22, 2009.

FIELD OF THE INVENTION

The present invention relates to an improved $CO_2$ sorbent comprised of a mesoporous silica functionalized with a polyamine obtained by the in-situ polymerization of a cyclic amine, such as azetidine. $CO_2$ is chemisorbed onto the polyamine portion of the sorbent, which is thermally reversible.

BACKGROUND OF THE INVENTION

The world remains dependent on petroleum-derived feedstreams as the source of energy, especially for use as transportation fuels. These feedstreams are produced from crude oils using various refinery processes in complex commercial petroleum refineries. While many useful products are produced in these refineries, undesirable side streams, such as acid gases ($CO_2$ and $H_2S$), are also produced. An increase of the concentration of $CO_2$, a greenhouse gas, in the atmosphere due to carbon emissions is expected to occur unless energy systems incorporate carbon emission reduction technology. $CO_2$ capture and sequestration, along with reduced carbon content of fuels and improved efficiency of energy production and use, are considered to be viable ways to stabilize and ultimately reduce the concentration of greenhouse gases.

$CO_2$ capture in industrial processes is typically done by aqueous amine scrubbing, which generally involves contacting the $CO_2$-containing gas stream with an aqueous solution of one or more simple amines such as diethanolamine, monoethanolamine, and the like. The amines chemically react with $CO_2$ in a reversible manner to form one or more of carbamate, ammonium bicarbonate, and ammonium carbonate species. Another acid gas scrubbing technology is the so-called "Rectisol Wash" process that uses an organic solvent, typically methanol, at subzero temperatures. SELEXOL™ is another conventional acid gas removal process wherein a proprietary solvent is used into which acid gases are dissolved from a hydrocarbon stream. Another commercial process for removing acid gases from hydrocarbon streams is a process marketed under the tradename PURISOL™, which uses N-methyl-2-pyrrolidone (NMP) as a solvent for absorbing acid gases.

Another gas scrubbing technology in commercial use is the Flexsorb™ process. This process removes acid gases from natural or flue gas streams using aqueous solutions of sterically hindered simple amines in a temperature swing process operating at temperatures of about 35 to about 85° C., or higher. The steric hindrance of the amine is used to suppress $CO_2$ uptake in order to best favor selective $H_2S$ removal. Since most process gas streams enter the scrubbing stage at elevated temperatures, much energy is consumed in heat transfer to cool the feed gas to the $CO_2/H_2S$ absorption temperature. A process that could operate in a non-aqueous-phase environment, and at higher temperatures, would be highly desirable, as would a process that is more selective for $CO_2$ as opposed to $H_2S$.

Polymeric amines (polyamines) and amine-bearing polymers are also used as $CO_2$ sorbents. Polymeric amines have much larger molecular weights than simple small-molecule amines and are therefore less volatile. Smaller sorbent loss is achieved through vaporization over the lifetime of the process for $CO_2$ sorption processes performed in the liquid phase using temperature swing. Polymeric amines may also be used in neat form as bulk sorbents.

Polyethylenimine, also known as poly(aziridine), is a polyamine of interest as a $CO_2$ sorbent. Poly(aziridine) is the polymeric form of aziridine (ethylenimine), a three membered ring cyclic amine, and is typically hyperbranched in microstructure. Branchy poly(aziridine)s are amorphous, viscous liquids at room temperature. Poly(aziridine) provides a number of advantages as a sorbent polymer, particularly a very high density of amine sites per weight (one amine site for every two carbon atoms). This high density of potentially reactive amine sites gives poly(aziridine) a very high potential $CO_2$ uptake on a weight basis and renders it a potentially very efficient sorbent.

$CO_2$ capture has also been performed using solid-phase sorbents in which simple amines are supported on the surface of, and/or within the pores of, silica and zeolite materials which may already function as active physisorbents for $CO_2$. These solid sorbents are advantageous over liquid-phase sorbents in that the $CO_2$-containing gas stream can be contacted directly with the sorbent without need of a liquid medium in a variety of configurations such as particles in fixed beds, fibers, etc. Both small molecule and polymeric amines, including poly(aziridine), have been used in supported form to absorb $CO_2$ from moist gases at moderate temperatures ($\leq 120°$ C.). Polymeric amines which are physically impregnated into, or chemically attached to a support, offer a greater number of amine binding sites than impregnated small-molecule amines due to the multifunctional (multi-amine) nature of the polymer species. Pre-made poly(aziridine)s have been impregnated and/or covalently attached to supports such as mesoporous silicas (MCM-41, SBA-15), other polymers, and carbon nanotubes and used for reversible $CO_2$ capture. Liquid poly(aziridine)s on poly(methyl methacrylate) substrates are utilized by NASA for $CO_2$ removal on the Space Shuttle. As compared to $CO_2$ absorption by neat poly(aziridine)s, synergistic effects between zeolitic supports and the poly(aziridine) can raise the absorption capacities of the polymer by a factor of about 2 to 3.

Poly(aziridine) can be introduced to an inorganic support in multiple fashions. Pre-polymerized poly(aziridine) may be physically impregnated onto the support by mixing in solution followed by evaporation of the solvent. This technique is non-selective in siting the polymer molecules on both the surface of the support and within its pores. Large, high-molecular-weight polymers may be too large to enter the pores, or may block entrance to them, giving non-optimal surface area of the chemical sorbent or destroying the synergistic effects provided by physisorption of the $CO_2$ within the pores of the mesoporous silica. In situ polymerization of aziridine in the presence of the inorganic support provides a method for efficiently introducing polymer molecules into pores, for example into those of mesoporous silicas, as described in Rosenholm, J. et al. *Chem. Mater.* 2007, 19, 5023; *Chem. Commun.* 2006, 3909. The chemisorptions of $CO_2$ using high surface area SBA-15 silica supports, such as MCM-41 mesoporous silica, that contain in-situ grown poly(aziridine)s are described in United States Patent Application Publication US2007/0149398A1, which is incorporated herein by reference. The poly(aziridine)s are prepared from aziridine monomer within the pores of the support utilizing the pendant hydroxyl, carboxylic acid, or other similar groups of the silica as initiating moieties for polymerization in the presence of a catalytic amount of a Brønsted acid such as acetic acid. In these materials, the loading (amount) of the branchy poly(aziridine)s is greater than in materials prepared by simple impregnation of pre-grown poly(aziridine)s, and higher $CO_2$ sorption capacities are achieved. These materials also offer good long-term stability as a result of the covalent attachment of the poly(aziridine) to the support.

While there exists several commercial processes for the sequestration of $CO_2$ from various hydrocarbon streams, there is still a need in the art for improvement, particularly with respect to costs, effectiveness, reversibility and toxicity. In particular, what is needed is a method to manipulate the properties of polyamine sorbents to provide improved safety, versatility, and $CO_2$ sorption capacity. For nanotube-supported poly(aziridine)s, $CO_2$ absorption efficiencies of only about ≤15% are known, suggesting that there is much room for manipulation of the polymer microstructure to improve $CO_2$ uptake. The accessibility of amine sites in supported poly(aziridine)s for $CO_2$ sorption has in some instances also been shown to be less than for monomeric amines. Furthermore, poly(aziridine) is prepared from a very volatile monomer, aziridine, having a high toxicity.

SUMMARY OF THE INVENTION

In accordance with the present invention there is provided a functionalized adsorbent material for adsorbing $CO_2$ from $CO_2$-containing gaseous streams, which adsorbent material comprises a mesoporous silica material having at least a portion of its pores functionalized with in-situ polymerized cyclic amine in which the density of amine sites on the polymer is below 20.0 mmol amine/gram.

In a preferred embodiment, the cyclic amine is azetidine and the resulting polymer is poly(azetidine) which is at least about 2% of the total weight of the adsorbent material.

In another preferred embodiment, the mesoporous silica material is selected from the group consisting of SBA-15 and MCM-41.

In still another preferred embodiment of the present invention the functionalized adsorbent material is further comprised of one or more additional components selected from the group consisting of amorphous silica binder, aluminum oxide binder, residual polymerization solvent, and residual polymerization initiator.

Also in accordance with the present invention is a method of preparing a functionalized adsorbent material comprised of a cyclic amine polymer for removing $CO_2$ from $CO_2$-containing gaseous streams, which method comprises:

forming a mixture comprised of a cyclic amine, a Brønsted acid initiator in a solvent, and a mesoporous silica;

forming the cyclic amine polymer in the presence of the mesoporous silica; and retrieving the resultant functionalized adsorbent material from the mixture as a solid;

wherein the resulting cyclic amine polymer has an amine density of below about 20.0 mmol amine/gram.

Also in accordance with the present invention is a method utilizing the functionalized adsorbent materials for removing $CO_2$ from a $CO_2$-containing gaseous stream, which method comprises contacting said stream with an effective amount of a functionalized adsorbent material comprising a mesoporous silica material having at least a portion of its pores functionalized with in-situ polymerized cyclic amine in which the density of amine sites of the in-situ polymerized cyclic amine is below 20.0 mmol amine/gram.

DETAILED DESCRIPTION OF THE INVENTION

Figure 1:
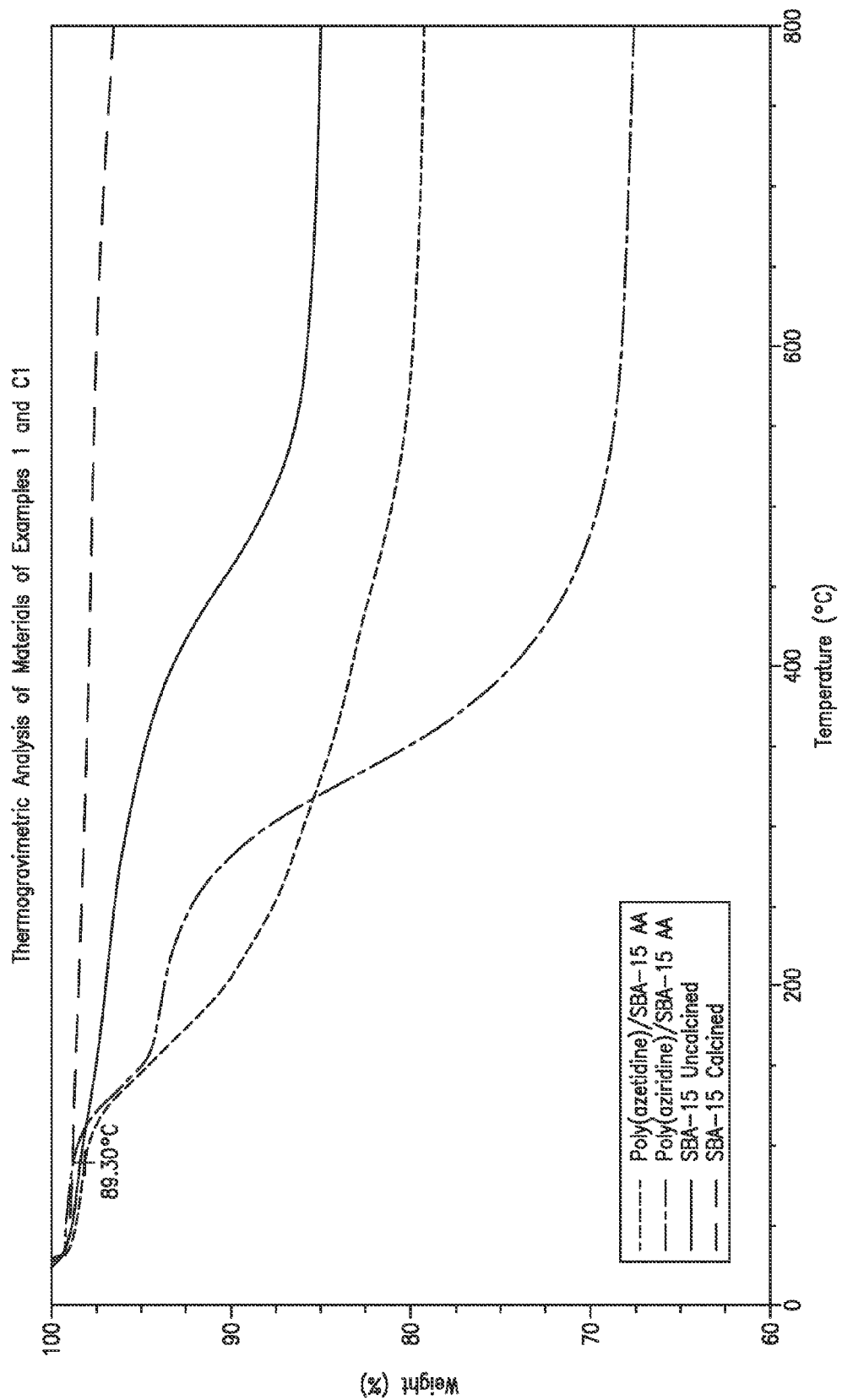
FIG. 1 hereof shows the thermogravimetric analysis under nitrogen of calcined and uncalcined SBA-15, the poly(azetidine)/SBA-15 material of Example 1 made with uncalcined SBA-15, and the analogous poly(aziridine)/SBA-15 material of Comparative Example C1.

It is unexpectedly found by the inventors hereof that poly (azetidine), despite having a lower density of amine sites per weight than poly(aziridine), provides unexpected advantages as a $CO_2$ sorbent when supported in the pores of a mesoporous silica material, or used as a component in a liquid phase sorbent, including higher molar sorption efficiency under industrially useful conditions, particularly conditions of low partial $CO_2$ pressure. The higher polyamine, poly(azetidine), is the polymeric form of azetidine (propylenimine or trimethylenimine), a four membered ring cyclic amine Poly(azetidine)s synthesized from trimethylenimine by cationic polymerization are hyperbranched. The general conditions for the synthesis of branchy poly(azetidine) are described in the literature, as for example in *Encyclopedia of Polymer Science and Engineering* (Wiley-Interscience), 1985, vol. 1, pp 680-739; Goethals, E. and Schacht, E. *Polymeric Amines and Ammonium Salts* (Pergamon), 1980, pp 67-77; Goethals, E. et al. *Polym. J.* 1980, 12, 571; Schacht, E. et al. *Makromol. Chem.* 1974, 175, 3447.

Equations 1 and 2 compare the chemical structures of azetidine/poly(azetidine) and aziridine/poly(aziridine) (the monomer and polymer of the analogous three membered ring cyclic amine). While both polymers are prepared via cationic polymerization, the conditions for azetidine polymerization typically require higher temperatures than those for aziridine polymerization.

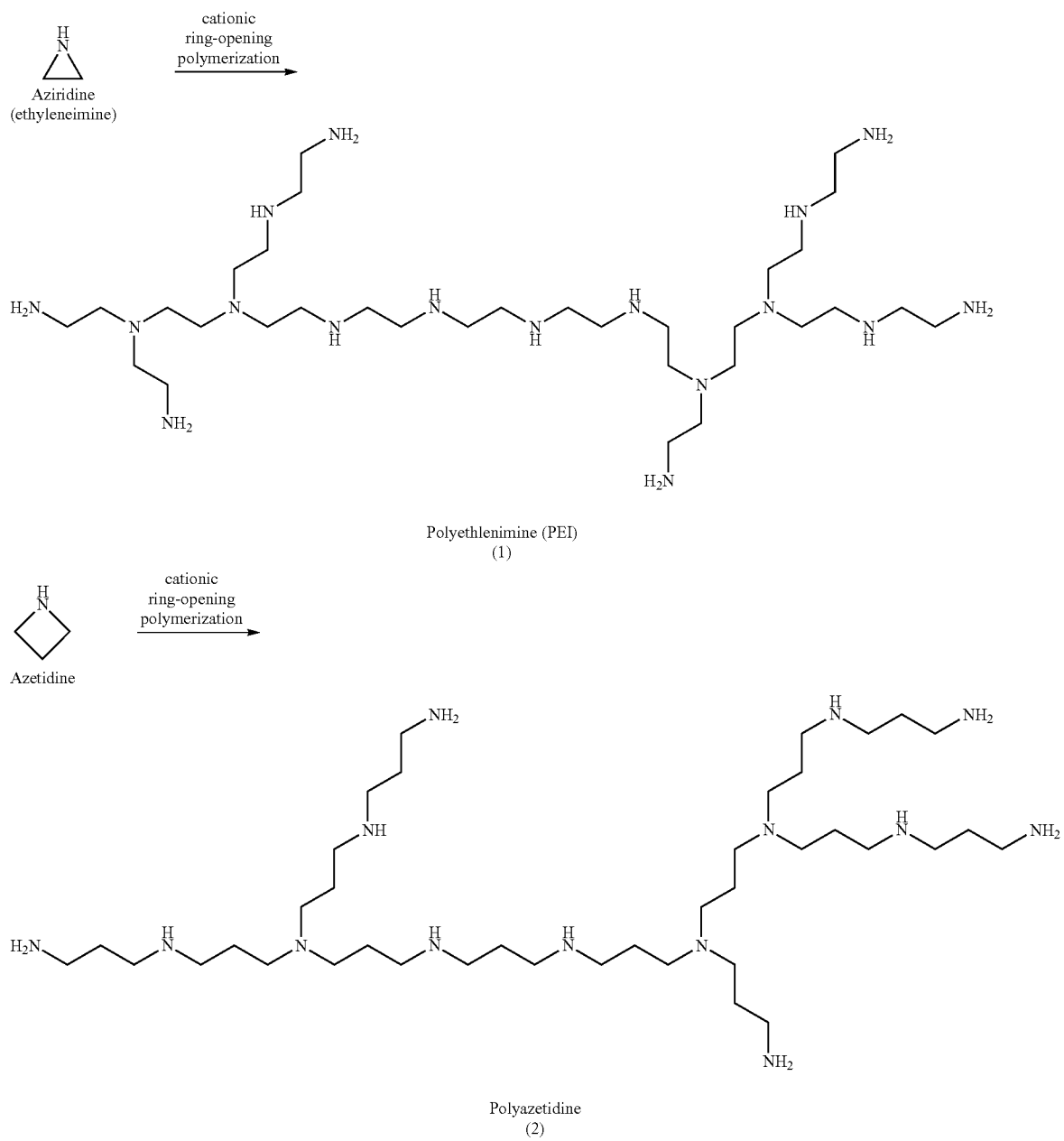

The current invention, involving poly(azetidine), provides a polymeric $CO_2$ sorbent material with a greater spacing between amine groups than poly(aziridine) while still maintaining a very high density of amines (one amine site for every three carbons). Table 1 provides a property comparison between azetidine and aziridine monomers and their polymers. In particular, the amine density (mmol amine per gram of polymer) is lower for poly(azetidine) than poly(aziridine). For example, the amine density per gram of poly(azetidine) is less than about 20 mmol, preferably from about 16.5 to about 19 mmol. Furthermore, azetidine monomer has a higher boiling point, lower vapor pressure, and higher flash point than aziridine, providing fewer hazards during polymerization to manufacture the sorbent. The greater relative hydrocarbon content of poly(azetidine) as compared to poly(aziridine) should give it greater solubility in non-aqueous solvents and miscibility with less polar polymers, offering opportunities to broaden its use window for $CO_2$ chemisorption.

Yet another benefit of the use of poly(azetidine) polymers versus the more common poly(aziridine)s, is improved oxidative stability. The poly(aziridine) structure shown in equation 1, is built from an ethylenimine repeat unit having a nitrogen atom every two carbon atoms. This structural unit has been shown to be particularly susceptible to oxidative degradation during regeneration of the amine-$CO_2$ complex (see H. Lepaumier, et al., *Ind. Eng. Chem. Res.*, 48, 9061 (2009), and C. W. Jones and W. Li, *paper no.* 573b, *Amer. Inst. Chem. Engr., National meeting*, Nov. 11, 2010, Salt Lake City). The poly(azetidine) structure disclosed here utilizes a propylenimine repeat unit having a nitrogen atom every three carbon atoms, thereby avoiding the presence of the oxidatively unstable ethylenediamine unit.

TABLE 1

Comparison of some properties of azetidine and aziridine monomers.

| Property | Azetidine | Aziridine |
|---|---|---|
| Molecular weight (g/mol) | 57.09 | 43.07 |
| Boiling point (° C.) | 62-63 | 55-56 |
| Density | 0.844 | 0.832 |
| Molality (moles/gram) of polymer | 17.5 millimolal | 23.2 millimolal |
| mMol amine per gram of polymer | 17.5 | 23.2 |
| Predicted pKa | 11.26 | 8.13 |
| Predicted vapor pressure, 25° C. | 162 torr | 221 torr |
| Flash point | −23.6, −21.0° C. | −39.0 |

In the $CO_2$-adsorbed form of poly(aziridine) (containing carbamate, ammonium bicarbonate, and/or ammonium carbonate functionalities depending on whether or not water is present), the very high amine density results in very closely spaced charge density and/or carbamate groups. The lower amine density of poly(azetidine), while nominally unfavorable from a theoretical weight capacity basis, is thought by the inventors hereof to lessen the stresses of charge repulsion steric hindrance, and therefore improve sorption behavior and thereby influence important polymer structure-property parameters, such as glass transition.

In one aspect of the present invention, there is provided an adsorbent material for adsorbing $CO_2$ from $CO_2$-containing gaseous streams, which adsorbent material is comprised of a mesoporous silica material having at least a portion of its pores functionalized with in-situ polymerized azetidine (poly(azetidine)).

In one embodiment of the invention, the poly(azetidine) is branched or hyperbranched and contains primary, secondary, and tertiary amine groups. The ratios of primary:secondary:tertiary amines in the polymer ranges from between about 2:96:2 to about 46:8:46.

In another embodiment, copolymerizations of free azetidine with other cyclic amines, such as N-substituted azetidines, or aziridines, or higher cyclic amines, may be performed in order to further tailor the polyamine structure. Copolymerizations of free azetidine with a small amount of an N-substituted azetidine bearing a siloxy group, for example:

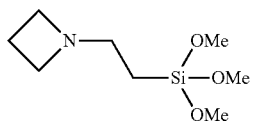

(3)

may be employed in order to produce materials that are anchorable to a silica support via hydrolysis and polycondensation of the siloxane group with the surface hydroxyl groups on the support. In this instance, the cyclic amine monomer (azetidine) is actually a mixture of azetidine with one or more other cyclic amine monomers.

The present invention is directed to the use of mesoporous silica supports. Mesoporous silicas, such as MCM-41 and SBA-15 (the most common mesoporous silicas), are porous, surfactant-templated silicas having an ordered array of mesopores that are monodispersed in pore diameter, and that are separated by silicon oxide walls that are disordered on an atomic scale. The mesopore diameter can be varied over the range of about 2 nm to about 20 nm. The pore volume of these materials ranges from about 0.3 cc/g to about 1.8 cc/g. In embodiments herein, the BET surface area of the functionalized mesoporous silica adsorbent ranges from about $100 m^2/g$ to about $1600 m^2/g$; from about $150 m^2/g$ to about $1500 m^2/g$; from about $200 m^2/g$ to about $1500 m^2/g$; from about $300 m^2/g$ to about $1500 m^2/g$; from about $700 m^2/g$ to about $1500 m^2/g$; or from about $1000 m^2/g$ to about $1500 m^2/g$. In more preferable embodiments herein the BET surface area of the functionalized mesoporous silica adsorbent ranges from about $200 m^2/g$ to about $1500 m^2/g$; or even more preferably from about $300 m^2/g$ to about $1500 m^2/g$. The large pore size and ordered pore morphology of these materials ensures that the reactant molecules are small enough to diffuse into the pores prior to polymerization and that the polymerized species can be accommodated within the pores.

In a preferred embodiment, the mesoporous silica material is selected from the group consisting of SBA-15, SBA-16, MCM-41, and MCM-48, preferably SBA-15 and MCM-41. The preparation of these materials is well known in the art. They are generally prepared by surfactant templating of a silica sol gel polycondensation. The products have structures featuring regularly order mesopores with walls consisting of an amorphous silica network. The amorphous wall structure has a very high concentration of surface hydroxyl groups that serve very effectively as anchoring sites for a variety of functional group attachments.

Also in accordance with the present invention is a method of preparing an adsorbent material for removing $CO_2$ from $CO_2$-containing gaseous streams. In general the adsorbent material is prepared by functionalizing a portion of the pores of a mesoporous silica material. The pores are functionalized by polymerizing, within the pores, a cyclic amine, which as previously mentioned is preferably azetidine. This is generally accomplished by contacting (i.e., producing a mixture of) a cyclic amine (or, as previously mentioned, a mixture of cyclic amines) having an amine density of below about 20.0 mmol amine/gram with a Brønsted acid initiator in a solvent in the presence of a mesoporous silica. The molar ratio of cyclic amine to Brønsted acid initiator will be from about 8:1 to about 30:1 and reaction temperatures will range from about 20° C. to about 120° C. Preferred Brønsted acid initiators include acetic acid and perchloric acid, with perchloric acid being more preferred. Preferred solvents include toluene and methanol, with methanol being more preferred. The in-situ polymer will represent from about 2% to about 65%, preferably from about 5% to about 65%, more preferably from about 7% to about 65%, most preferably from about 10% to about 65%, particularly from about 15% to about 65% of the total weight of the adsorbent material.

Also in accordance with the present invention is a method for removing $CO_2$ from a $CO_2$-containing gaseous stream, which method comprises contacting said stream with an effective amount of adsorbent material comprised of a mesoporous silica material having at least a portion of its pores functionalized with in-situ polymerized azetidine (poly(azetidine)).

It is within the scope of this invention that a liquid phase sorbent containing a polymerized cyclic amine, preferably poly(azetidine), be used. It will typically be used in an absorption tower, where a gaseous stream containing $CO_2$ countercurrently contacts the liquid absorbent. The $CO_2$ and amine of the sorbent chemically react to form chemisorption products, thereby removing the $CO_2$ from the gaseous stream. After the sorbent is loaded with $CO_2$ to a satisfactory level, or at a designated cycle time, the sorbent can be regenerated. When used as a liquid phase sorbent, regeneration of the $CO_2$ containing sorbent typically involves desorbing the absorbed $CO_2$ by stripping the liquid-phase sorbent with an inert gas, a natural gas stream or steam in a regeneration zone. During this step, the chemisorption products are decomposed, $CO_2$ is removed, and the amine is freed to its original state and ready for re-use. It is preferred that the liquid be water and that the polymer comprise from about 1% to about 30% of the total liquid phase sorbent in the adsorption phase of the process. It is also preferred that the temperature during the adsorption phase of the process be from about 15° C. to about 120° C.

Most commercially practiced chemical absorption of $CO_2$ with amines is performed in aqueous solution. In aqueous solutions, there are several chemisorption products that form including ammonium carbamates and ammonium bicarbonates/carbonates. When bicarbonate/carbonate products (which require the presence of a stoichiometric amount of water) are present, bicarbonates are preferred because they provide a theoretical 1:1 $CO_2$:amine uptake ratio (an ammonium bicarbonate, $R_3NH^+HCO_3^-$) whereas a carbonate only provides a theoretical 1:2 $CO_2$:amine uptake ratio (a diammonium carbonate, $[R_3NH^+]_2 CO_3^{2-}$). In one embodiment of the invention, the chemisorption products remain soluble in the reaction medium after $CO_2$ uptake so that they can be regenerated as a liquid phase by the techniques described above.

The following Examples demonstrate the synthesis of poly (azetidine) via cationic polymerization in the presence and absence of a mesoporous silica support, and its use as a solid $CO_2$ sorbent on the mesoporous silica, or in a liquid sorbent composition. The purpose of these Examples is to illustrate several preferred embodiments of the present invention and are not to be taken as limiting the scope of the present invention in any way.

EXAMPLES

Materials and Instrumentation.

Samples for elemental analysis were handled under an inert atmosphere or only briefly exposed to air before analysis. Thermogravimetric analysis was performed using a TA Instruments AutoTGA 2950HR instrument from 25-800° C. at 10° C. minute (60 cc gas/min flow through furnace; 40 cc gas/min flow through balance; sample size 1.5-5 mg). Samples were maintained in sealed vials under argon until just before use. Differential Scanning Calorimetry (DSC) was performed using a TA Instruments 2920 calorimeter fitted with a liquid $N_2$ cooling accessory. Samples were loaded at room temperature under $N_2$ in a dry-box into sealed pans, cooled to about −130° C. at 10° C./min and analyzed on heating (two cycles) to 150° C. at a rate of 10° C./min. NMR spectra not run as part of uptake experiments were obtained in 5 mm tubes using a narrow-bore Bruker Advance III 400 MHz Ultrashield spectrometer with a high resolution 5-mm QNP probe.

Examples 1 and C1 hereof demonstrate the polymerization or oligomerization of azetidine and aziridine in situ over SBA-15 mesoporous silica in toluene at 25° C. using acetic acid as the catalytic Brønsted acid initiator. This procedure is successful for aziridine to produce a high loading of poly (aziridine) on the mesoporous silica, but produces only a low weight of poly(azetidine). Examples 2 and 3 hereof demonstrate the bulk polymerization of azetidine under similar conditions at higher temperatures. In these cases, the poly(azetidine) formed is primarily dimer or oligomer structures, rather than high molecular weight polymer.

Example 1

Synthesis of SBA-15-Supported Poly(Azetidine) in Toluene at 25° C. Using Acetic Acid Initiator SBA-15 mesoporous silica was prepared by mixing 100 mL of a 1.7 M aqueous HCl solution with 2.83 g Pluronic[(R)] P-123 organic template. To this solution was added slowly at room temperature a 6.0 g (6.4 mL) portion of tetraethylorthosilicate. The resulting mixture was stirred for 30 minutes, heated to 40° C. for 20 hours, and aged at 90° C. without stirring for 1 day. It was cooled and the solids were collected by filtration, rinsed with deionized water and acetone, and dried at 90° C. under vacuum. A 2.0 g portion of the resultant material was dispersed in 240 mL of a 48 wt % aqueous $H_2SO_4$ solution, heated at 95° C. for 1 day, and cooled to room temperature. The solids were again collected by filtration and rinsed with deionized water until the filtrate showed a pH of 7. The product SBA-15 solids were then dried at 95° C. under vacuum (BET surface area 622 $m^2$/g; pore volume 1.21 cc/g; structural confirmation by X-ray diffraction). Azetidine (Aldrich Chemical Co., 98%) was distilled at 50° C./520 mm Hg into an ice water-cooled receiving flask, degassed by several freeze-pump-thaw cycles, and taken into a dry box. A 1.53 g portion (26.8 mmol) was weighed into a Schlenk flask which was capped with a rubber septum. An 0.825 g portion of SBA-15 (dried under high vacuum for 3 hours and separately taken into the dry box) was added to a 50 mL Schlenk flask containing a stirbar and slurried with 7 mL dry toluene (previously dried by distillation from sodium benzophenone ketyl). Both flasks were removed from the drybox and placed under argon on a Schlenk line. Under atmospheric conditions, 150 mg glacial acetic acid (2.5 mmol) was weighed into a third Schlenk flask, placed under argon on a Schlenk line, and degassed by several freeze-pump-thaw cycles. Dry toluene (4 mL; loaded into a dry syringe in the dry box) was added to the acetic acid. The toluene/acetic acid solution was then added to the stirred SBA-15 slurry via syringe, followed by addition of the azetidine monomer solution. The slurry was stirred overnight at room temperature. The silica particles were then collected by filtration under atmospheric conditions and re-slurried with 200 mL dry toluene. After re-filtration and rinsing with additional dry toluene, the silica particles were dried in a vacuum oven for 7 days at 50° C. and further dried on a Schlenk line under high vacuum (0.742 g of white solid; 33% of theoretical yield for 100% azetidine conversion). Elemental analysis (ash differential) indicated a 5.26 wt % content of poly(azetidine) in the material (Table 2 hereof).

Thermogravimetric analysis was performed on the sample under both air and nitrogen from room temperature to 800° C. To calculate the weight percent of the material attributable to polymer, its TGA curves were overlaid with that for the precursor SBA-15 material (as well as those for the material prepared in Comparative Example C1 and the calcined SBA-15 used in Example 6 hereof). All of the materials showed a small initial weight loss (<200° C.) presumably due to adsorbed ambient moisture and/or $CO_2$. Given that the neat SBA-15 and the polymer-functionalized material are likely to have different surface properties and amounts of ambient adsorbate, and thus may desorb these adsorbates at different apparent rates in the TGA, care was taken to select an appropriate temperature "start" point to represent the beginning of true weight loss due to organic matter (e.g. polymer, residual template).

FIG. 1 hereof shows the thermogravimetric analysis under nitrogen of calcined and uncalcined SBA-15, the poly(azetidine)/SBA-15 material, and the analogous poly(aziridine)/SBA-15 material of Comparative Example C1 hereof. As shown, a start point of 89.3° C. was selected as the start point for weight loss under $N_2$ (90.5° C. under air). These temperatures represent the point at which the curves began to deviate from each other and otherwise similar initial weight loss behavior. The weight loss from the start point to 800° C. was calculated for each material, normalized as if the 90.5 or 89.3° C. weight was 100%, and the difference between the SBA-15 and the polymer-functionalized material was taken as the weight % polymer. The value obtained under nitrogen (5.62 wt %, relatively consistent with elemental analysis data) was chosen as the best value to represent wt % polymer for calculational purposes (Table 2 hereof). The inconsistency for values seen with TGA under air are attributed to the high amount of residual organic template in the SBA-15.

Comparative Example C1

Synthesis of SBA-15-Supported Poly(Aziridine) (Polyethylenimine) in Toluene at 25° C. Using Acetic Acid Initiator A procedure similar to Example 1 hereof was carried out using the following reagents: 1.3 g aziridine (ethylenimine; 3B Scientific, 99.75%; 30.2 mmol, distilled similarly to azetidine), 0.7 g SBA-15 silica, 127.3 mg (2.1 mmol), and 10 mL total dry toluene. An 0.75 g quantity (40% of theoretical yield) of a white solid was obtained. Elemental analysis (ash differential) indicated a 19.17 wt % content of poly(aziridine) in the material; thermogravimetric analysis as described in Example 1 indicated a 17.99 wt % content (Table 2 and FIG. 1 hereof).

TABLE 2

Characterization data for materials prepared in Example 1 and Comparative Example C1.
Elemental Analysis

| Material | % C | % H | % N | Sum CHN | % Si | % Ash |
|---|---|---|---|---|---|---|
| SBA-15 | 4.04 | 0.86 | 0.57 | 5.47 | 38.84 | 84.16 |
| Ex. 1 poly(azetidine)/SBA-15[a] | 9.06 | 1.70 | 1.89 | 12.65 | 35.61 | 78.90 |
| " | 8.86 | 1.88 | 1.88 | 12.62 | 34.88 | — |
| Ex. C1 poly(aziridine)/SBA-15[a] | 14.96 | 3.53 | 6.22 | 24.71 | 31.77 | 64.95 |
| " | 4.78 | 3.64 | 6.22 | 24.64 | 34.44 | 65.04 |
| Theo. for poly(azetidine) | 63.11 | 12.36 | 24.53 | — | — | — |
| Theo. for poly(aziridine) | 55.78 | 11.70 | 35.52 | — | — | — |
| Net avg. poly(azetidine), Ex. 1 | 4.92 | 0.93 | 1.32 | 7.17 | — | 5.26[b] |
| Net avg. poly(aziridine), Ex. C1 | 10.83 | 2.73 | 5.65 | 19.21 | — | 19.17[b] |

[a]Note in each case there is ~9-11% wt % unaccounted for when ash and total CHN are summed; this may represent oxygen from the unremoved organic template or from other sources (C and H wt % arising from the template would be included in the CHN measurement).
[b]Difference in ash between SBA-15 and polymer-functionalized materials (using average ash measurement).

Thermogravimetric Analysis

| Material | 90.5-800° C. loss, air | 89.3-800° C. loss, $N_2$ |
|---|---|---|
| SBA-15[a] | 17.78 | 13.64 |
| Ex. 1 poly(azetidine)/SBA-15 | 19.25 | 19.26 |
| Ex. C1 poly(aziridine)/SBA-15 | 32.42 | 31.63 |
| % poly(azetidine), Ex. 1 | 1.47 | 5.62 |
| % poly(aziridine), Ex. C1 | 14.64 | 17.99 |

[a]The calcined SBA-15 used in Example 6 showed a weight loss of 3.36% in air and 2.34% under nitrogen.

Summary of Important Parameters

| Material | Wt. polymer in 1 gram (mg)[a] | Amine molality (mmol amine/gram) | BET surface area ($m^2$/gram)[b] | Pore volume (cc/gram)[b] |
|---|---|---|---|---|
| Ex. 1 poly(azetidine)/SBA-15 | 56.2 | 0.984 | 425 | 0.96 |
| Ex. C1 poly(aziridine)/SBA-15 | 719.9 | 4.174 | 270 | 0.63 |

[a]Using TGA, $N_2$ data.
[b]For starting silica: surface area = 622 $m^2$/g; pore volume = 1.21 cc/g.

Example 2

Synthesis of Oligomeric Bulk Poly(Azetidine) in Toluene at 80° C. Using Acetic Acid Initiator Azetidine (1.035 g, 18.1 mmol; distilled as described in Example 1 hereof and stored in a freezer in the drybox between uses) was mixed with 5 mL dry toluene in a Schlenk tube in the dry-box along with a stirbar. A stirbar was added and the tube was removed from the drybox and placed under argon on a Schlenk line. Glacial acetic acid (100 mg, 1.67 mmol, was prepared and transferred as described in Example 1 hereof) was added. The Schlenk tube was partially immersed in an 80° C. oil bath (up to the level of liquid inside) leaving a large volume of empty tube above. Tubing containing a flow of chilled water was wrapped around this empty volume of Schlenk tune a few times to create a condensing zone. After the contents of the tube had warmed to 80° C., the tube was shut off from argon and stirred for 1 hour. Subsequently, the tube was opened to the atmosphere, cooled, and the contents were diluted with 20 mL dry toluene to assist in terminating the polymerization. The toluene was then removed under vacuum and the residual material dried further under high vacuum. A ~120 mg portion (12%) of low-viscosity liquid was obtained. $^1$H NMR analysis of the material was similar to that reported for the dimer (N-3-aminopropyl)azetidine, plus residual acetic acid. $^1$H NMR (CDCl$_3$, 400 MHz): δ 3.54 (tr, 4H, J=7.6 Hz, ring NCH$_2$—), 2.93 (tr, 2H, J=6.6 Hz, linear NCH$_2$—), 2.83 (tr, 2H, J=6.8 Hz, —CH$_2$NH$_2$), 2.22 (quintet, 2H, J=7.6 Hz, ring NCH$_2$CH$_2$—), 1.77 (quintet, 2H, J=6.7 Hz, —CH$_2$CH$_2$NH$_2$. $^{13}$C NMR (CDCl$_3$, 100 MHz): δ 55.28, 53.95 (~2C), 38.23, 23.87, 16.67, plus peaks attributed to residual acetic acid by DEPT-135 at 177.44 and 23.37 ppm.

Example 3

Synthesis of Oligomeric Bulk Poly(Azetidine) in Toluene at 100° C. Using Acetic Acid Initiator A procedure similar to Example 2 hereof was performed using 1.3 g (22.8 mmol) azetidine, 103 mg (1.72 mmol) acetic acid, and 5 mL dry toluene. The polymerization was carried out for 20 hours at 100° C. in a sealed Schlenk tube wrapped with chilled-water tubing. After cooling, the contents of the tube were not diluted with additional toluene; the polymer solution was transferred to a vial and the toluene was evaporated by blowing nitrogen into the vial, followed by drying the polymer residue under high vacuum at room temperature. A ~150 mg portion (12%) of light yellow, viscous liquid was obtained. The $^1$H and $^{13}$C NMR spectra of this product were more complex than the sample made at 80° C., but still suggested the predominant species had an intact cyclic azetidine endgroup (indicating low molecular weight). $^1$H NMR (CDCl$_3$, 400 MHz): major peaks at δ 3.07 (tr, >4H, J=7.1 Hz, ring NCH$_2$—), 2.71 (tr, 2H, J=6.7 Hz, linear NCH$_2$—), 2.40 (tr, 2H, J=7.1 Hz, —CH$_2$NH$_2$), 1.93 (app tr, 2H, J=6.7 Hz, ring NCH$_2$CH$_2$—), 1.46 (app tr, 2H, J=6.7 Hz, —CH$_2$CH$_2$NH$_2$); multiple smaller resonances. $^{13}$C NMR (CDCl$_3$, 100 MHz): major peaks at δ 57.49, 54.64 (~2C), 39.51, 26.96, 17.15 (shoulder), 17.13; multiple smaller resonances.

Example 4

Figure 2:
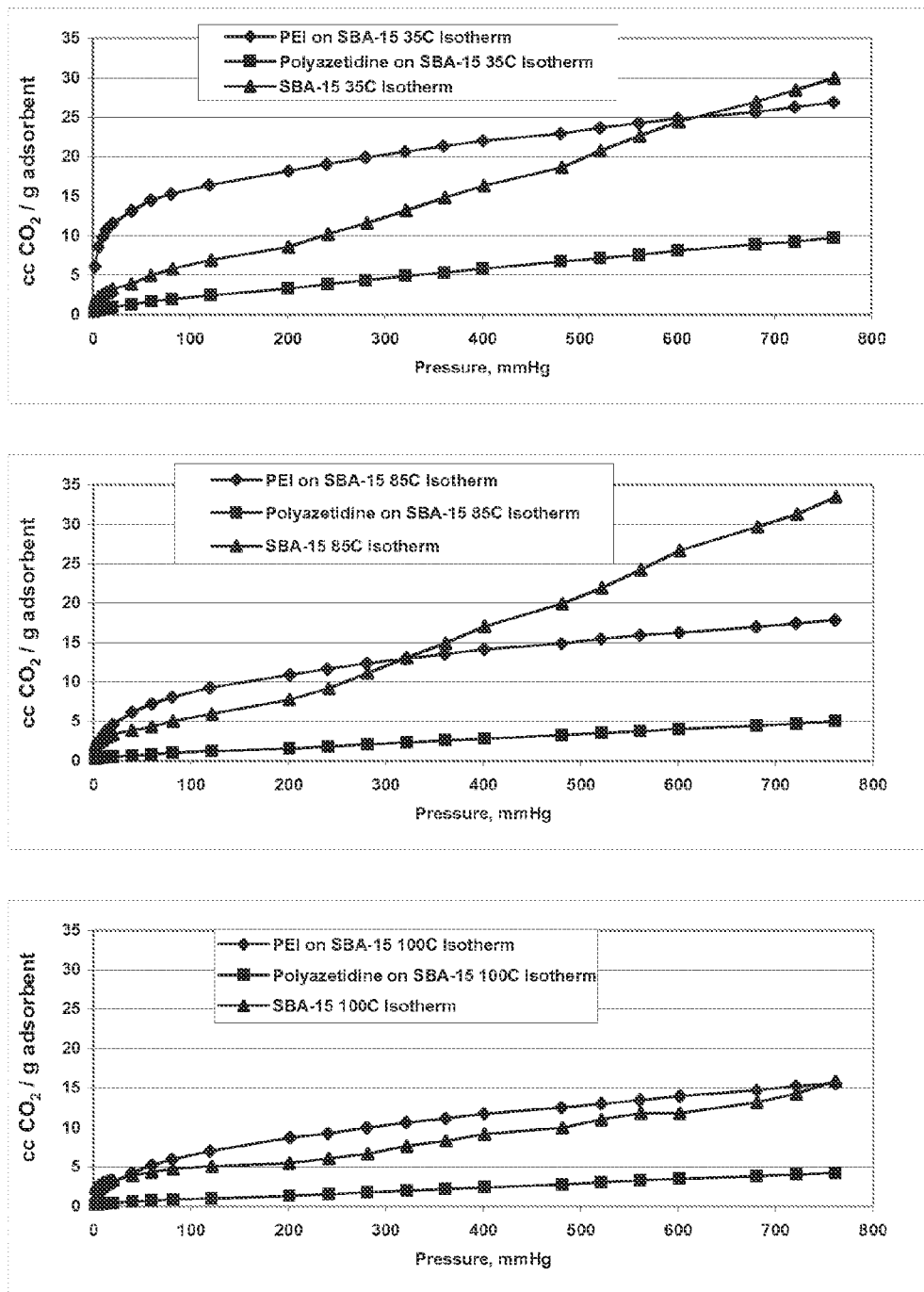
FIG. 2 hereof shows overlaid combined 35-100° C. isotherms contrasting $CO_2$ adsorption behavior for neat uncalcined SBA-15, the poly(azetidine)/SBA-15 of Example 1, and the poly(aziridine)/SBA-15 ("PEI") of Comparative Example C1.

CO$_2$ Uptake of Acetic Acid-Initiated Poly(Azetidine)-Functionalized Mesoporous SBA-15 Silica and Comparative Neat and Poly(Aziridine)-Functionalized SBA-15 Silicas at 0.1 and 1.0 atm CO$_2$ An Autosorb-1 (Quantachrome Instruments, Boynton Beach, Fla. equipped with a furnace for temperature control and supplied with Airgas research grade CO$_2$) was used to obtain CO$_2$ uptake curves for the materials prepared in Examples 1 and C1 hereof along with the starting SBA-15 silica. For each material, a portion of the designated weight was weighed into the dried sample tube in a drybox and capped with a rubber septum. The sealed tube was not opened until immediately before loading and pre-treatment under vacuum (105° C., 2 hours). Typically, a strong combined isotherm (representing both physisorption and chemisorption) was first measured as the sample was exposed to CO$_2$ from vacuum to 1.0 atm to obtain the volume of CO$_2$ adsorbed per gram of adsorbent. Typically the uptake is measured at 29 points between 0.003 and 1.0 atm. The sample was then evacuated (to remove weakly bound, i.e. physisorbed, molecules), and then re-measured ("weak isotherm") to separately quantify the re-adsorbing (physisorbing) molecules. An equilibrium time of 3 minutes was used. The tubes were backfilled with helium after completion of analysis, and were weighed quickly after removal from the Autosorb to determine weight loss. The data is summarized in FIG. 2 and Table 3 hereof. FIG. 2 hereof shows overlaid combined 35-100° C. isotherms contrasting CO$_2$ absorption behavior for neat SBA-15, poly(azetidine)/SBA-15, and poly(aziridine)/SBA-15 ("PEI").

TABLE 3

Total Autosorb CO$_2$ uptake in cc CO$_2$ per gram of sorbent for the poly(azetidine)-functionalized mesoporous SBA-15 silica of Example 1, comparative neat SBA-15 silica, and the comparative poly(aziridine)-functionalized SBA-15 silica of Example C1.

| Sample (Ex. No.)$^a$ | CO$_2$ uptake, 35° C. | CO$_2$ uptake, 85° C. | CO$_2$ uptake, 100° C. |
|---|---|---|---|
| 0.1 atm CO$_2^b$ | | | |
| Neat SBA-15 | 5.81 | 5.03 | 4.76 |
| Poly(azetidine)/SBA-15, 5.62 wt % polymer (Ex. 1) | 1.95 | 0.96 | 0.84 |
| Poly(aziridine)/SBA-15, 17.99 wt % polymer (Ex. C1) | 15.27 | 8.03 | 5.94 |
| 1.0 atm CO$_2^c$ | | | |
| Neat SBA-15 | 30.00 | 33.47 | 15.87 |
| Poly(azetidine)/SBA-15, 5.62 wt % polymer (Ex. 1) | 9.79 | 5.01 | 4.25 |
| Poly(aziridine)/SBA-15, 17.99 wt % polymer (Ex. C1) | 26.85 | 17.81 | 15.54 |

$^a$Sample weights: SBA-15, 3.4 mg; poly(azetidine)/SBA-15, 36.6 mg; poly(aziridine)/SBA-15, 32.8 mg.
$^b$Data points taken at 0.1057-0.1082 atm.
$^c$Data point taken at end of run (1.0026-1.0013 atm).

In this example, the poly(azetidine)/SBA-15 material adsorbs CO$_2$ at both low partial pressures (e.g. 0.1 atm) and high partial pressures (1.0 atm), and at all three temperatures. However, the low weight percent and low molecular weight of the polymer provides non-optimal results. The poly(azetidine), unlike the poly(aziridine), does not provide a synergistic effect to enhance the adsorption capacity of the SBA-15 at low partial pressures.

Examples 5 and 6 hereof demonstrate the synthesis of higher molecular weight poly(azetidine) in bulk and in the presence of calcined SBA-15 by cationic polymerization using a more polar solvent (methanol), a stronger Brønsted acid initiator (perchloric acid), and a higher polymerization temperature. Comparative Example C2 hereof describes the synthesis of a comparative poly(aziridine)/SBA-15 under identical conditions.

Example 5

Synthesis of Bulk Poly(Azetidine) at 70° C. Using Perchloric Acid Initiator A small glass vial was charged with 65 mg (0.45 mmol) of 70% aqueous perchloric acid, which was diluted with 5 mL methanol. Separately, as-received azetidine (500 mg, 8.76 mmol, undistilled) was added to a Schlenk tune containing a stirbar. The perchloric acid solution was then added via pipet. The contents of the tube were degassed by several freeze-pump-thaw cycles (not heating above ~45° C. during thaw). The tube (under vacuum) was then placed in an oil bath at 70° C. and stirred for 1 week. The closed sidearm of the tube was maintained under a positive pressure of Ar in case of leakage into the tube. Subsequently, the methanol was removed under high vacuum at room temperature and the polymeric residue was further dried under high vacuum to give 0.538 g of a solid material. This material was dissolved in distilled water to make a 1 wt % solution which was lyophilized by freeze drying. The residue was further dried under high vacuum at room temperature overnight and then at 50° C. overnight to give 0.45 g (90%) of a hard, sticky, light orange semitransparent material.

Figure 3:
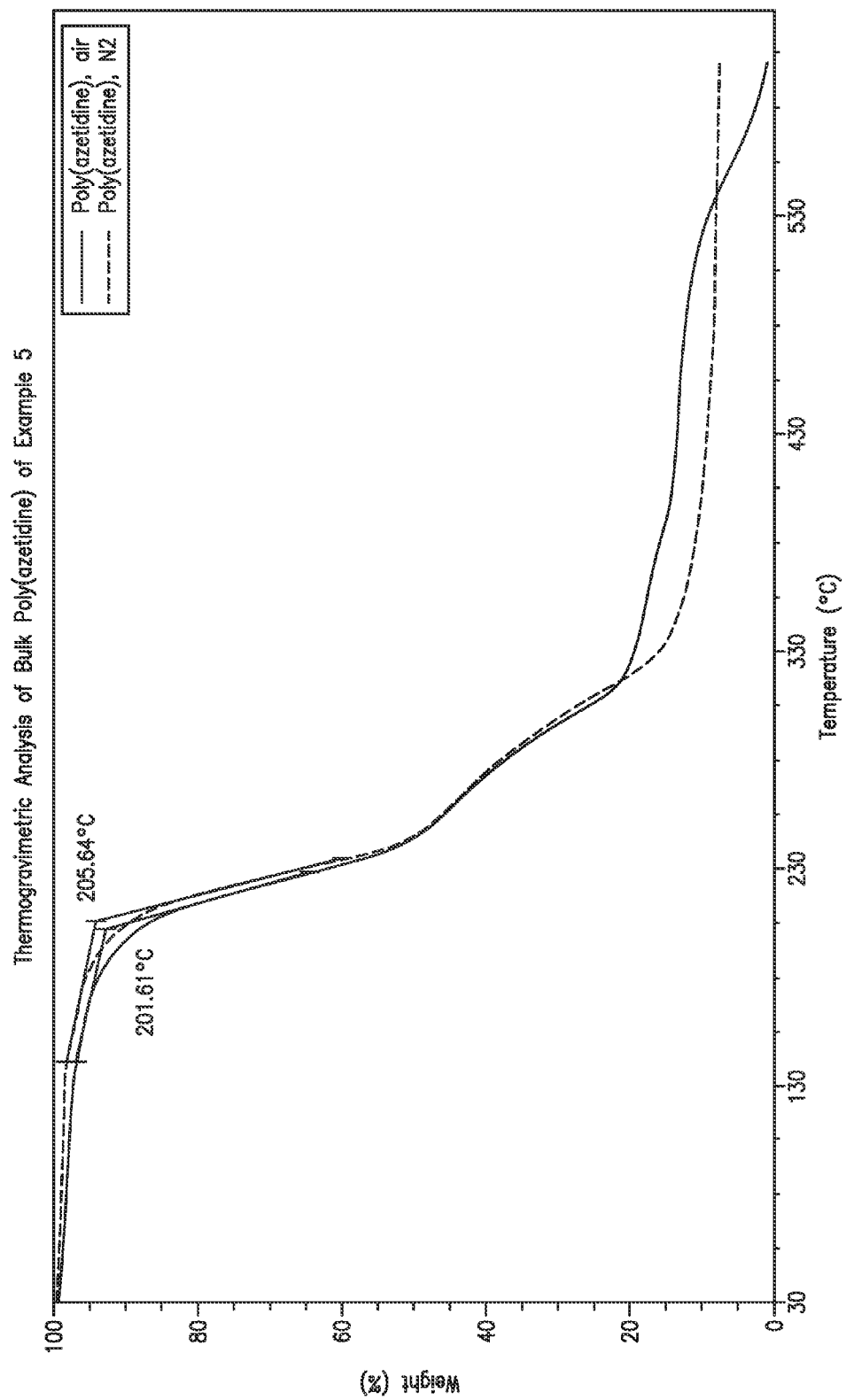
FIG. 3 hereof shows the thermogravimetric analysis under nitrogen and air of the bulk poly(azetidine) prepared in Example 5.

Elemental analysis indicated the presence of chlorine, presumably residual HClO$_4$ either in acid form or partially as poly(azetidinium) perchlorate salts. Average values from two analyses: C, 51.69; H, 10.04; N, 19.19; Cl, 9.66 (see Table 2 hereof for theoretical values; normalizing the C and H to the found % N gives a 78.2% content of poly(azetidine)). DSC $T_g$: $1^{st}$ heat, 12.9° C.; $2^{nd}$ heat, 7.5° C. Thermogravimetric analysis of the polymer (FIG. 3) indicated minor weight loss from 135 to 200-205° C. (~9%) with onset of major decomposition occurring at 205.6° C. in air and 201.6° C. under nitrogen. $^1$H NMR ($D_2O$, 50° C., 400 MHz; shown in FIG. 7): δ 4.69 (protio $D_2O$ typically set to 4.81 ppm exchanging with —NH), 3.30 and 3.12 (overlapped br m and br s, minor, endgroup structures $NCH_2$—), 2.97 and 2.89 (each br tr, minor, ring and endgroup structures $NCH_2$— in 1:1 ratio), 2.71 (br, polymer —$CH_2NH_2$), 2.60 (br, —$CH_2NH$—), 2.44 (br) (4H, polymer —$CH_2N<$), 1.61 (br, 2H, polymer $NCH_2CH_2$—). A small amount of residual methanol was present (br s, 3.75 ppm). The polymer was stored in a dry box until use. $^{13}$C NMR ($D_2O$, 100 MHz, 24° C., 60 second repetition delay, no calibrant; shown in FIG. 7): δ 51.97, 51.14, 50.73, 50.31, 46.57, 46.12, 45.71 (—$NCH_2$—), 43.20 (—$NCH_2$—, may be associated with products from minor ambient $CO_2$ uptake and/or minor peaks near 164 ppm), 38.50, 38.02 (—$NCH_2$—), 28.27, 26.75, 25.79, 24.33, 21.76 (—$NCH_2CH_2$—). The ratio of primary to secondary to tertiary amines was approximately 27.6:44.8:27.6 by $^1$H NMR. Assuming no cyclic structures, such that the number of primary and tertiary amines must be the same, ⅓ of the tertiary amine —$CH_2N<$integral may be attributed to primary amine —$CH_2NH_2$ groups in the combined 2.71-2.60 secondary and primary amine $NCH_2CH_2$–/–$CH_2NH$— integral.

Example 6

Synthesis of SBA-15-Supported Poly(Azetidine) in Methanol at 70° C. Using Perchloric Acid Initiator A small glass vial was charged with 65 mg (0.45 mmol) of 70% aqueous perchloric acid, which was diluted with 5 mL methanol. In the drybox, a Schlenk tube was loaded with a stirbar and 700 mg SBA-15 mesoporous silica (prepared similarly to the SBA-15 of Example 1 hereof but subsequently calcined at 550° C. in air for 3 hours). The tube was removed from the drybox, and as-received azetidine (300 mg, 5.25 mmol) was added under atmospheric conditions. The perchloric acid solution was then added via pipet. The contents of the tube were degassed by several freeze-pump-thaw cycles (not heating above ~45° C. during thaw). The tube (under vacuum) was then placed in an oil bath at 70° C. and stirred for 1 week. The closed sidearm of the tube was maintained under a positive pressure of Ar in case of leakage into the tube. The contents of the tube were subsequently cooled, opened to the atmosphere, and the silica particles were collected by filtration, rinsed with additional methanol, and dried under vacuum at 50° C. overnight to give a fluffy white powder (0.8 g, 80% of theoretical yield for 100% azetidine conversion).

Figure 4:
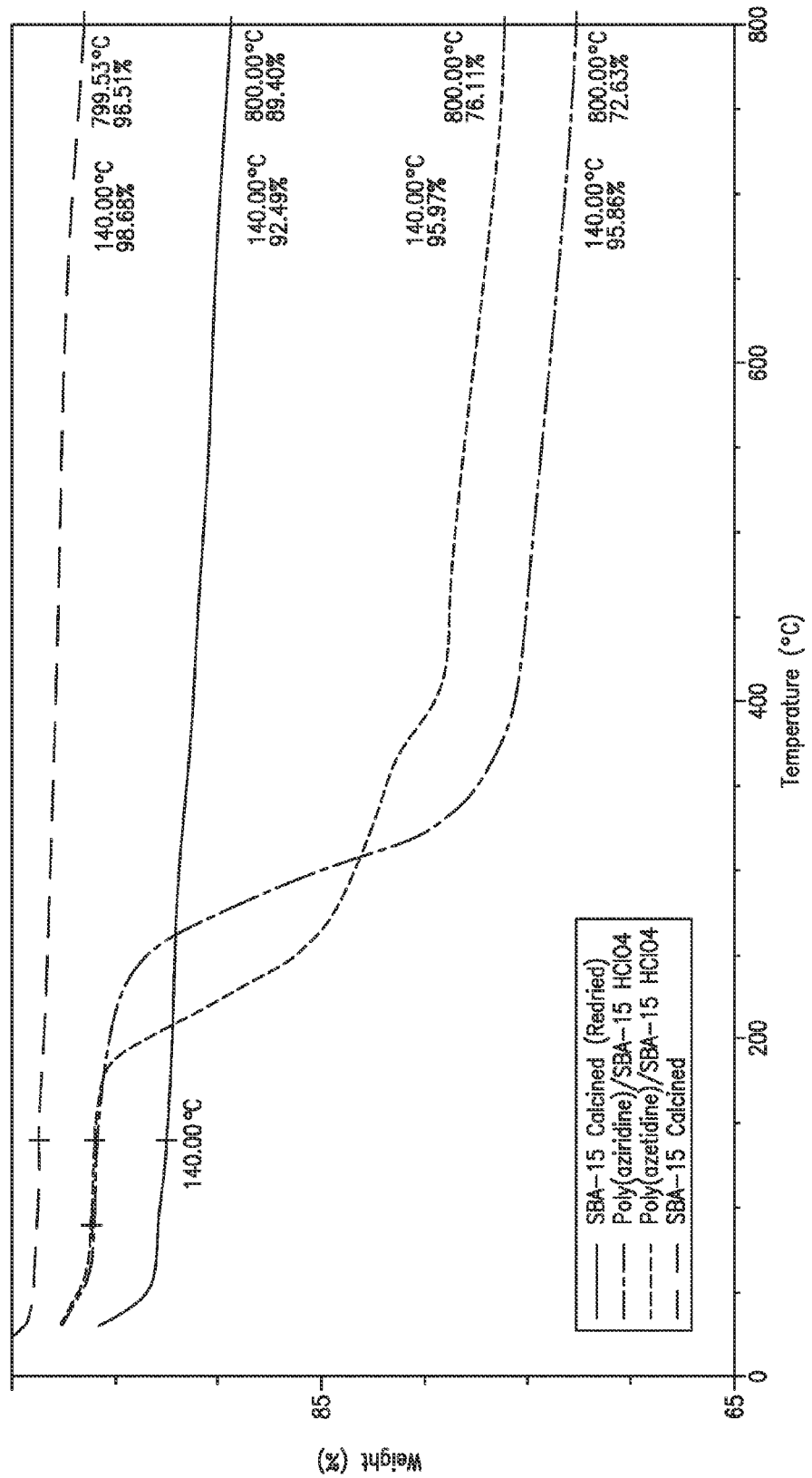
FIG. 4 hereof shows the thermogravimetric analysis under nitrogen of calcined SBA-15, the poly(azetidine)/SBA-15 material of Example 6 made with calcined SBA-15, and the analogous poly(aziridine)/SBA-15 material of Comparative Example C2.

Elemental analysis indicated the presence of chlorine, presumably residual $HClO_4$ either in acid form or partially as (poly(azetidinium) perchlorate salts. The content of poly (azetidine)+residual $HClO_4$ by ash differential was 18.66 wt % (Table 4). The content of poly(azetidine) based on the found % N was 15.16 wt %. Thermogravimetric analysis as described in Example 1 showed a 17.34 wt % content of poly(azetidine)+residual $HClO_4$ (Table 4). The TGA curves for the material and the precursor calcined SBA-15 (along with the material prepared in Comparative Example C2) are shown in FIG. 4 hereof. The SBA-15 was redried at 200° C. overnight under high vacuum and reanalyzed by TGA at the same time as the polymer-functionalized material to provide the best baseline for analysis. The freshly redried SBA-15 sample showed a slightly higher weight loss than upon initial analysis, likely due to an increased affinity for atmospheric water and $CO_2$; the start point for analysis under $N_2$ was increased from 89.3 to 140° C. to account for this effect.

Comparative Example C2

Synthesis of SBA-15-Supported Poly(Aziridine) in Methanol at 70° C. Using Perchloric Acid Initiator A procedure identical to Example 6 hereof was carried out substituting 300 mg (6.97 mmol) aziridine instead of azetidine. The aziridine was distilled as described in Comparative Example C1 hereof and loaded into the Schlenk tube containing the SBA-15 while still in the drybox. After overnight vacuum drying, an 0.83 g quantity of a fluffy white powder was obtained (83% of theoretical yield for 100% aziridine conversion). Elemental analysis (ash differential) indicated a 21.33 wt % content of poly(aziridine)+residual $HClO_4$. The content of poly(aziridine) based on the found % N was 17.89 wt %. Thermogravimetric analysis as described in Example 6 hereof indicated a 20.69 wt % content (Table 4 and FIG. 4 hereof).

TABLE 4

Characterization data for materials prepared in Example 6 and Comparative Example C2.
Elemental Analysis

| Material | % C | % H | % N | Sum CHN | % Cl | Sum CHN + Cl[a] | % Si | % Ash |
|---|---|---|---|---|---|---|---|---|
| SBA-15 | 0.17 | 0.31 | <0.05 | 0.48 | — | — | 41.51 | 93.50 |
| Ex. 6 poly(azetidine)/SBA-15 | 11.28 | 2.49 | 3.67 | 17.44 | 1.24 | 18.69 | 31.49 | 74.84 |
| Ex. 6 poly(azetidine)/SBA-15 | 11.21 | 2.46 | 3.77 | 17.44 | 1.26 | 18.69 | 31.13 | — |
| Ex. C2 poly-(aziridine)/SBA-15 | 11.31 | 2.87 | 5.75 | 19.93 | 0.61 | 20.54 | 31.05 | 72.17 |
| Ex. C2 poly-(aziridine)/SBA-15 | 11.33 | 2.70 | 5.88 | 19.91 | 0.60 | 20.52 | 29.97 | — |
| Theo. for poly(azetidine) | 63.11 | 12.36 | 24.53 | 100 | 0 | 100 | — | — |

TABLE 4-continued

Characterization data for materials prepared in Example 6 and Comparative Example C2.

Elemental Analysis

| Material | % C | % H | % N | Sum CHN | % Cl | Sum CHN + Cl[a] | % Si | % Ash |
|---|---|---|---|---|---|---|---|---|
| Theo. for poly(aziridine) | 55.78 | 11.70 | 32.52 | 100 | 0 | 100 | — | — |
| Net avg. Ex. 6 poly(azetidine) | 11.25 | 2.48 | 3.72 | 17.44 | 1.25 | 18.69 | 31.31 | 18.66 |
| Net avg. from % N,[b] Ex. 6 poly(azetidine) | 9.57 | 1.87 | 3.72 | 15.16 | — | — | — | — |
| Net avg. Ex. C2 poly(aziridine) | 11.32 | 2.79 | 5.82 | 19.92 | 0.61 | 20.53 | 30.51 | 21.33 |
| Net avg. from % N,[b] Ex. C2 poly(aziridine) | 9.98 | 2.09 | 5.82 | 17.89 | — | — | — | — |

[a]Taking average % Cl for sum.
[b]Because the unfunctionalized SBA-15 has 0% N, the CHN attributable specifically to the polyamine may be calculated from the found % N value.

Thermogravimetric Analysis

| Material | 90.5-800° C. loss, air | 140-800° C. loss, $N_2$ |
|---|---|---|
| SBA-15 (initial analysis[a]) | 3.36 | 2.20[b] |
| SBA-15 (redried) | 4.03 | 3.34 |
| Ex. 6 poly(azetidine)SBA-15 | 21.83 | 20.69 |
| Ex. C2 poly(aziridine)/SBA-15 | 26.32 | 24.23 |
| % poly(azetidine), Ex. 6 | 17.80 | 17.34 |
| % poly(aziridine), Ex. C2 | 22.29 | 20.69 |

[a]Analyzed in the same data set as Table 2.
[b]Wt loss from 89.3-800° C. = 2.34%.

Summary of Important Parameters

| Material | Wt. polymer in 1 gram (mg)[a] | Amine molality (mmol amine/gram) | BET surface area ($m^2$/gram)[b] | Pore volume (cc/gram)[b] |
|---|---|---|---|---|
| Ex. 6 poly(azetidine) SBA-15 | 151.6 | 2.653 | 346 | 0.75 |
| Ex. C2 poly(aziridine)/ SBA-15 | 178.9 | 4.150 | 218 | 0.48 |

[a]Using elemental analysis data calculated from found % N.
[b]Not taken for starting silica.

Example 7

Figure 5A:
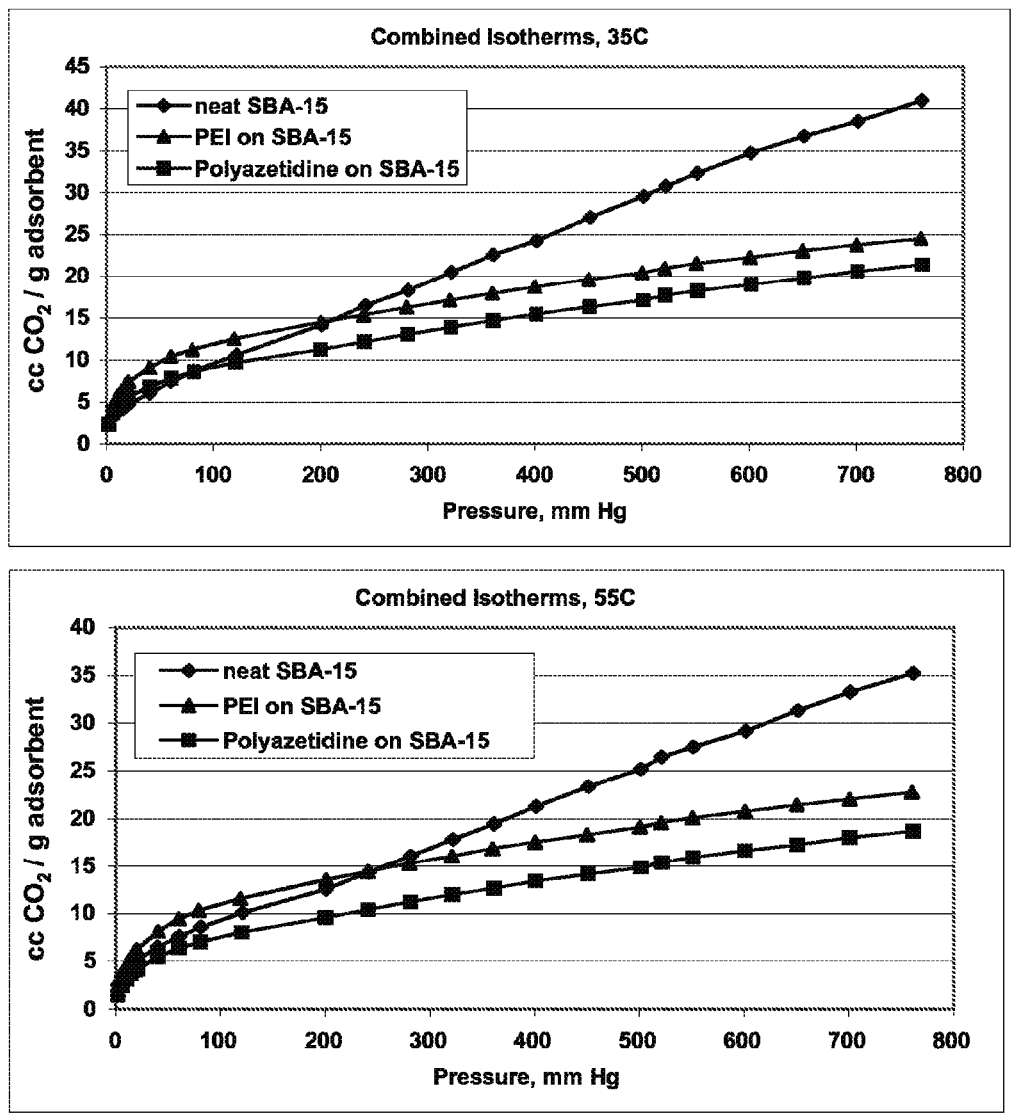
FIGS. 5a and 5b hereof shows overlaid combined 35-100° C. isotherms contrasting $CO_2$ absorption behavior for neat uncalcined SBA-15, the poly(azetidine)/SBA-15 of Example 6, and the poly(aziridine)/SBA-15 ("PEI") of Comparative Example C2.
Figure 5B:
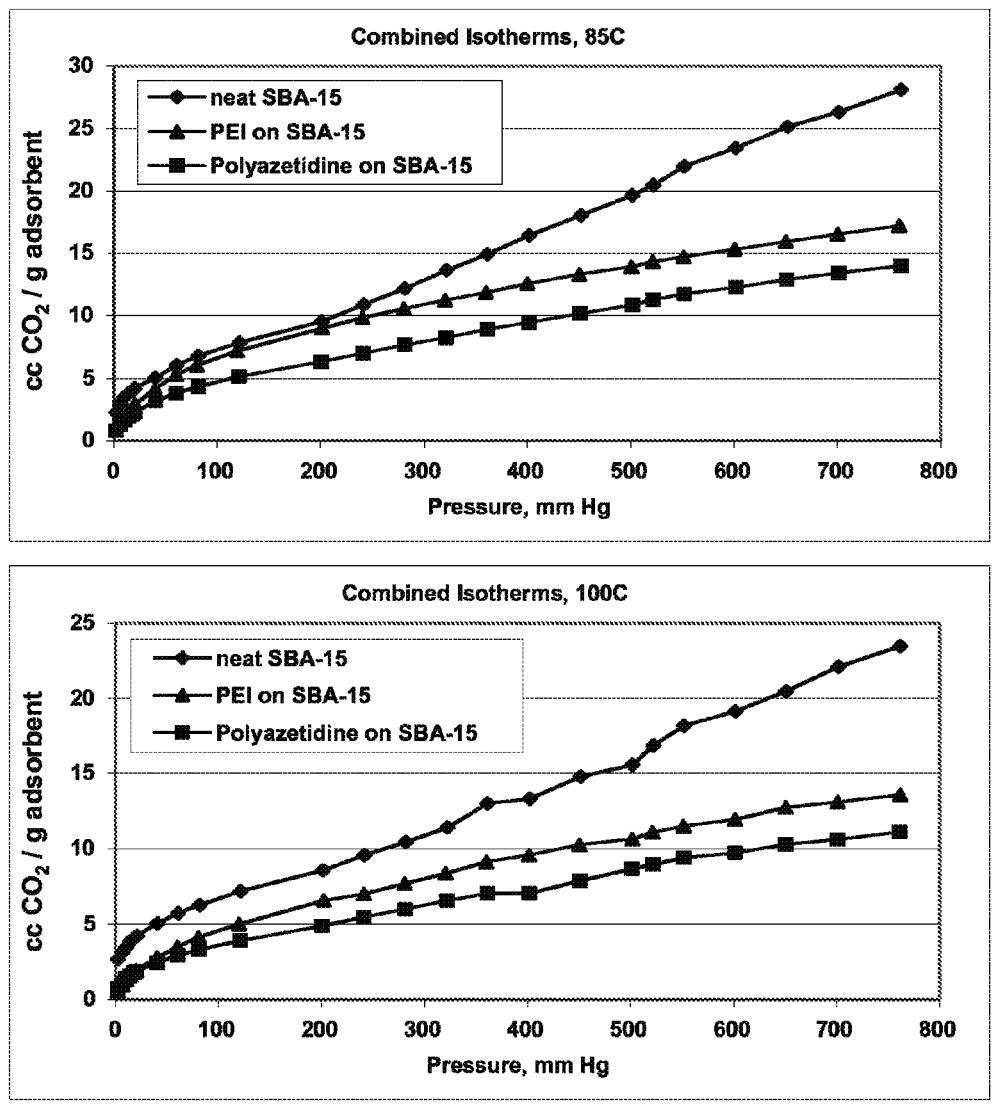
Figure 6:
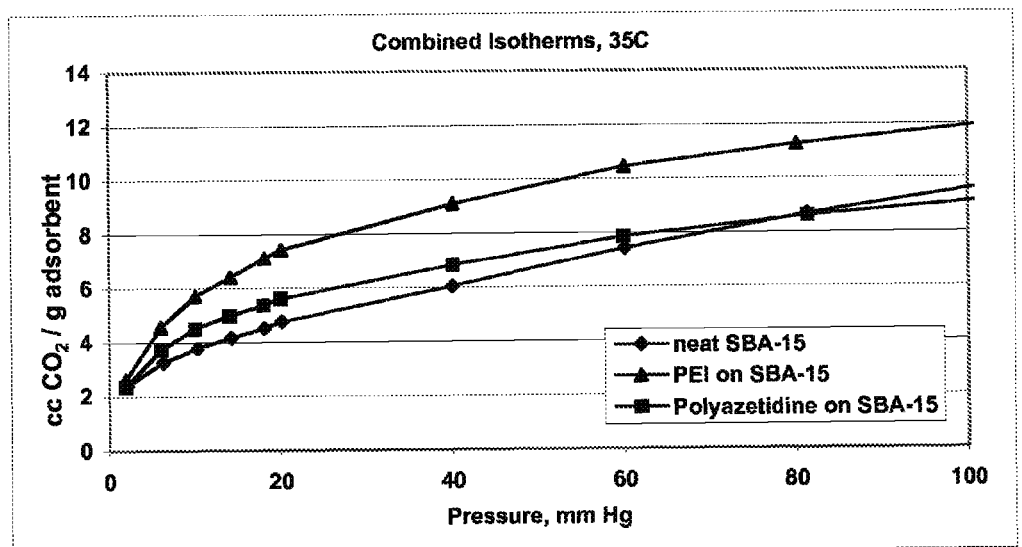
FIG. 6 hereof shows an expansion of the low pressure region (0 to 0.13 atm) of the 35° C. isotherm of FIG. 5.

$CO_2$ Uptake of Perchloric Acid-Initiated Poly(Azetidine)-Functionalized Mesoporous SBA-15 Silica and Comparative Neat and Poly(Aziridine)-Functionalized SBA-15 Silicas at 0.02, 0.04, 0.1, and 1.0 atm $CO_2$ $CO_2$ uptake of the materials prepared in Examples 6 and C2 hereof was studied, along with the starting SBA-15 silica, using a similar Autosorb procedure as described in Example 4 hereof with an additional set of isotherms collected at 55° C. The data is summarized in FIGS. 5a, 5b, and 6 as well as Table 5 hereof FIGS. 5a and 5b herein show overlaid combined 35-100° C. isotherms contrasting $CO_2$ absorption behavior for neat SBA-15, poly(azetidine)/SBA-15, and poly(aziridine)/SBA-15 ("PEI"). Both the poly(azetidine)/SBA-15 and poly(aziridine)/SBA-15 materials show enhanced $CO_2$ adsorption over the unfunctionalized SBA-15 at lower partial pressures (up to ca. 0.1 atm, see FIG. 6), an important feature given that flue and natural gas streams typically contain only low to moderate amounts of $CO_2$.

TABLE 5

Total Autosorb $CO_2$ uptake in cc $CO_2$ per gram of sorbent for the poly(azetidine)-functionalized mesoporous SBA-15 silica of Example 6, comparative neat SBA-15 silica, and the comparative poly(aziridine)-functionalized SBA-15 silica of Example C2.

| Sample (Ex. No.)[a] | $CO_2$ uptake, 35° C. | $CO_2$ uptake, 55° C. | $CO_2$ uptake, 85° C. | $CO_2$ uptake, 100° C. |
|---|---|---|---|---|
| 0.02 atm $CO_2$[b] | | | | |
| Neat SBA-15 | 4.16 | 4.55 | 3.86 | 3.86 |
| Poly(azetidine)/SBA-15, 15.16 wt % pol. (Ex. 6) | 4.98 | 3.69 | 1.96 | 1.58 |
| Poly(azetidine)/SBA-15, 17.89 wt % pol. (Ex. C2) | 6.40 | 5.35 | 2.35 | 1.56 |
| 0.05 atm $CO_2$[c] | | | | |
| Neat SBA-15 | 6.04 | 6.51 | 5.07 | 5.06 |
| Poly(azetidine)/SBA-15, 15.16 wt % pol. (Ex. 6) | 6.83 | 5.46 | 3.19 | 2.45 |
| Poly(azetidine)/SBA-15, 17.89 wt % pol. (Ex. C2) | 9.10 | 8.12 | 4.17 | 2.76 |
| 0.1 atm $CO_2$[d] | | | | |
| Neat SBA-15 | 8.68 | 8.57 | 6.81 | 6.27 |
| Poly(azetidine)/SBA-15, 15.16 wt % pol. (Ex. 6) | 8.62 | 7.05 | 4.36 | 3.31 |
| Poly(azetidine)/SBA-15, 17.89 wt % pol. (Ex. C2) | 11.25 | 10.34 | 6.04 | 4.12 |
| 1.0 atm $CO_2$[e] | | | | |
| Neat SBA-15 | 40.95 | 35.23 | 28.11 | 23.48 |
| Poly(azetidine)/SBA-15, 15.16 wt % pol. (Ex. 6) | 21.41 | 18.70 | 14.01 | 11.12 |
| Poly(azetidine)/SBA-15, 17.89 wt % pol. (Ex. C2) | 24.50 | 22.79 | 17.20 | 13.56 |

[a]Sample weights: SBA-15, 5.2 mg; poly(azetidine)/SBA-15, 20.6 mg; poly(azetidine)/SBA-15, 34.2 mgs.
[b]Data points taken at 0.0184-0.0193 atm.
[c]Data points taken at 0.0525-0.0531 atm.
[d]Data points taken at 0.1049-0.1080 atm.
[e]Data point taken at end of run (1.0005-1.0027 atm).

Example 8

Calculation of Efficiency of Amine $CO_2$ Uptake by Poly(Azetidine)/SBA-15 and Poly(Aziridine)/SBA-15 Materials at 0.02, 0.05, 0.1, and 1.0 atm $CO_2$ For each temperature and pressure point, the total $CO_2$ uptake in millimoles per gram of sorbent of the polyamine-functionalized SBA-15 materials was divided by its amine molality (mmol amine per gram) given in Table 4 hereof The resultant absorption efficiencies are given in Table 6 below. These show that the poly(azetidine) is more efficient than the poly(aziridine) on a molar basis for the adsorption of $CO_2$ at all temperatures and partial pressures.

TABLE 6

Amine efficiency at various pressures of $CO_2$ absorption for the poly(azetidine)- and poly(aziridine)-functionalized mesoporous SBA-15 silicas of Examples 6 and C2 (units = mmol $CO_2$/mmol amine).

| Sample (Ex. No.) | 35° C. | 55° C. | 85° C. | 100° C. |
|---|---|---|---|---|
| 0.02 atm $CO_2$ | | | | |
| Poly(azetidine)/SBA-15 (Ex. 6) | 0.084 | 0.062 | 0.033 | 0.027 |
| Poly(aziridine)/SBA-15 (Ex. C2) | 0.069 | 0.058 | 0.025 | 0.017 |
| 0.05 atm $CO_2$ | | | | |
| Poly(azetidine)/SBA-15 (Ex. 6) | 0.115 | 0.092 | 0.054 | 0.041 |
| Poly(aziridine)/SBA-15 (Ex. C2) | 0.098 | 0.087 | 0.045 | 0.030 |
| 0.1 atm $CO_2$ | | | | |
| Poly(azetidine)/SBA-15 (Ex. 6) | 0.145 | 0.119 | 0.073 | 0.056 |
| Poly(aziridine)/SBA-15 (Ex. C2) | 0.121 | 0.111 | 0.065 | 0.044 |
| 1.0 atm $CO_2$ | | | | |
| Poly(azetidine)/SBA-15 (Ex. 6) | 0.360 | 0.315 | 0.236 | 0.187 |
| Poly(aziridine)/SBA-15 (Ex. C2) | 0.264 | 0.245 | 0.185 | 0.146 |

Figure 7A:
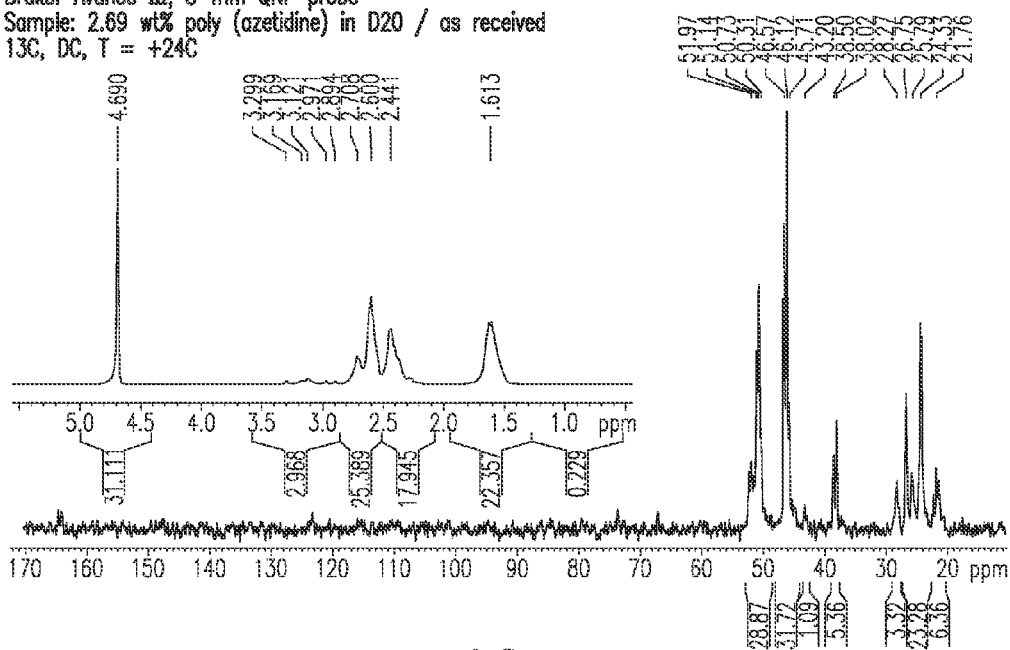
FIGS. 7a and 7b hereof shows $^{13}C$ NMR spectra for the aqueous poly(azetidine) solution of Example 9 (and 5) before (FIG. 7a, 24° C.) and after (FIG. 7b, 30° C.) treatment with 1 atm $CO_2$ for ca. 10 hours.
Figure 7B:
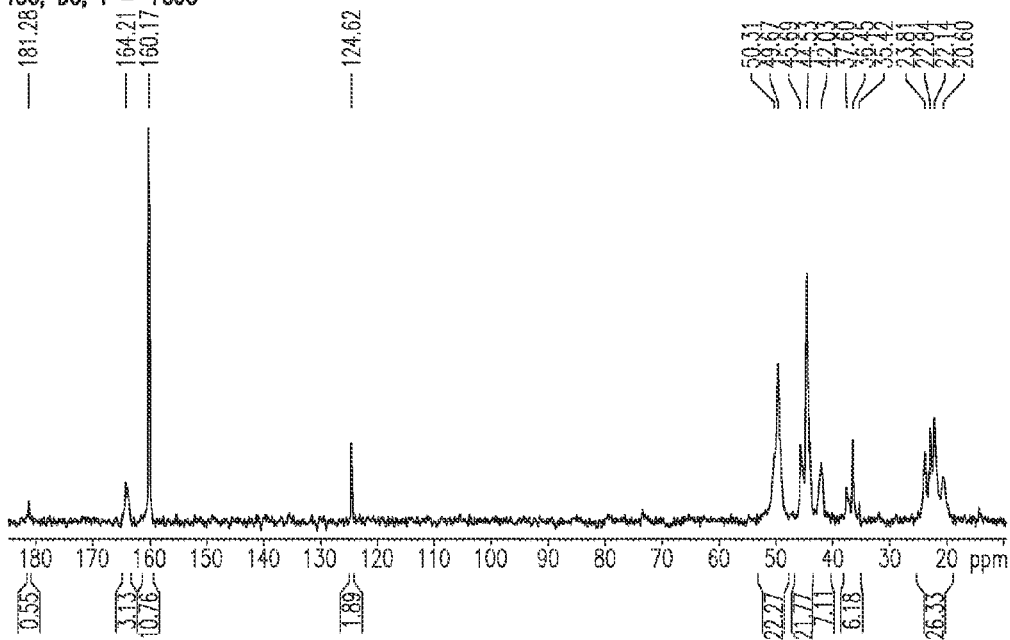

FIG. 7 hereof shows $^{13}C$ NMR spectra for the aqueous poly(azetidine) solution of Example 9 before (top, 24° C.) and after (bottom, 30° C.) treatment with 1 atm $CO_2$ for ca. 10 hours.

Figure 8A:
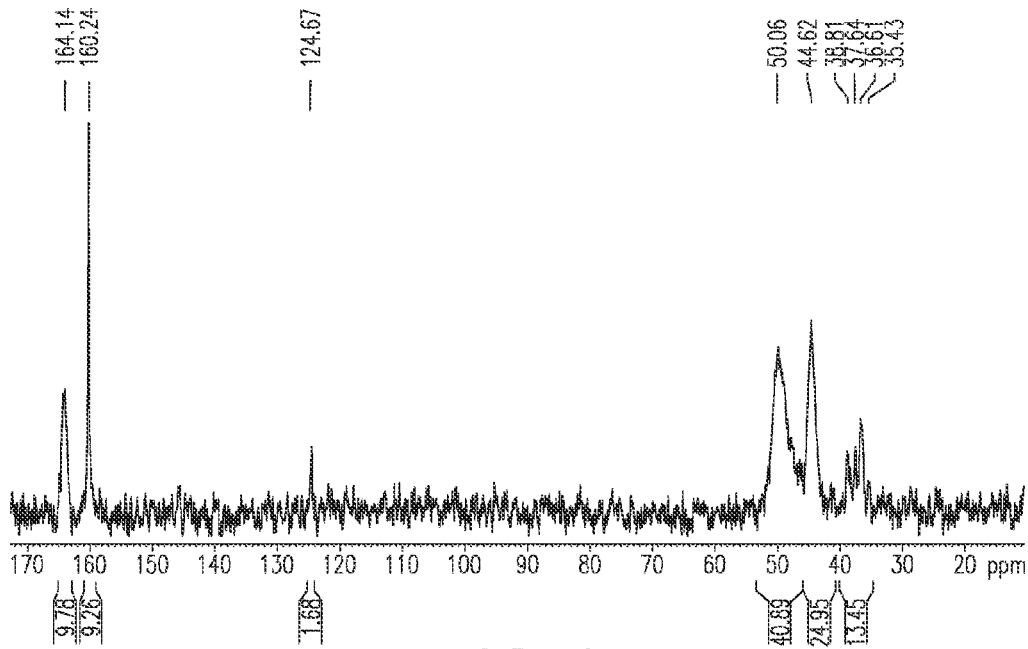
FIGS. 8a and 8b hereof shows $^{13}C$ NMR spectra for the aqueous poly(aziridine) solution ("PEI") of Comparative Example C3 before (FIG. 8a, 24° C.) and after (FIG. 8b, 24° C.) treatment with 1 atm $CO_2$ for 7 hours.
Figure 8B:
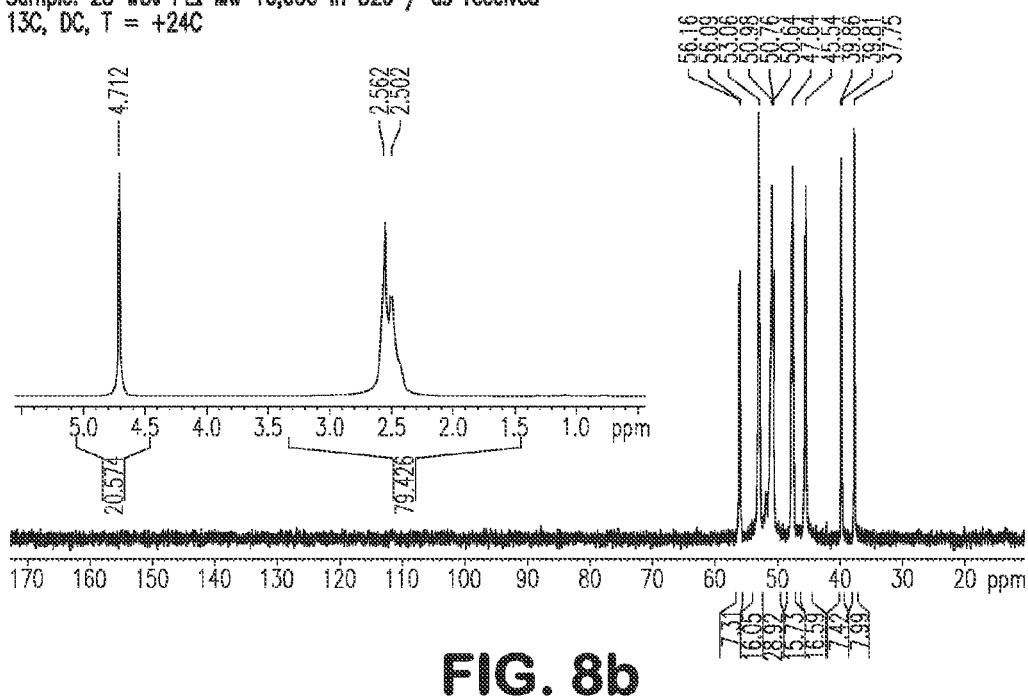

FIG. 8 hereof shows $^{13}C$ NMR spectra for the aqueous poly(aziridine) ("PEI") solution of Comparative Example C3 before (top, 24° C.) and after (bottom, 24° C.) treatment with 1 atm $CO_2$ for 7 hours.

Example 9 hereof demonstrates the use of poly(azetidine) as an efficient $CO_2$ sorbent when used in the aqueous phase. Comparative Example C3 presents a comparative adsorption experiment using a commercial poly(aziridine). Similarly to the results seen in the dry, solid-state absorption experiments of Example 7, the poly(azetidine) is a more efficient sorbent on a molar amine basis than the poly(aziridine). The poly(azetidine) also produces a different balance of ammonium carbamate and ammonium (bi)carbonate products. The enhanced proportion of (bi)carbonate species formed with the poly(azetidine) may provide advantages for low-temperature-swing adsorption, since (bi)carbonates are less thermally stable than carbamates and may require lower desorption temperatures.

Example 9

Liquid Phase $CO_2$ Adsorption Using an Aqueous Solution of Poly(Azetidine)

A 128.4 mg portion of the poly(azetidine) prepared in Example 5 was dissolved in $D_2O$ in an 8-inch 10 mm NMR tube to make a 2.69 wt % solution. The solution was exposed to a $CO_2$ purge (1 atm, 10 cc/min, measured by a Brooks 5896 flow controller) via a plastic capillary dip tube at 30° C. inside a 10 mm wide-bore Bruker Advance 400 MHz NMR spectrometer with a BBO probe. The $^1H$ and $^{13}C$ NMR spectra were monitored until no further $CO_2$ uptake was observed; the $^{13}C$ spectrum after ca. 10 hours (as shown in FIG. 7 hereof before and after adsorption) indicated formation of both ammonium carbamate and ammonium (bi)carbonate products, as well as the presence of physisorbed $CO_2$ in solution (physisorbed $CO_2$ is not seen in control experiments with neat $D_2O$). Integrating the three carbonyl peaks versus the total aliphatic (polymer) integral (mmol $CO_2$ per mmol amine) gave molar loadings of 11.2% carbamate, 38.6% (bi)carbonate, and 7.2% physisorbed $CO_2$ (overall 57.0 mol % loading; 43.9 wt % loading of polymer weight; 30.5 wt % loading of combined polymer+$CO_2$ weight). The $^1H$ NMR showed two broad peak clusters with major peaks at 3.39, 3.17 (major), 2.87, 2.75 (4H, NCH$_2$—) and 2.15, 1.97 (major) (2H, NCH$_2$CH$_2$—). $^{13}C$ NMR (30° C., 100 MHz, no calibrant, 60 second repetition delay): δ 181.28 (minor, unassigned), 164.21 (br, carbamate C=O), 160.17 (bicarbonate and/or carbonate C=O in fast equilibrium), 124.62 (physisorbed $CO_2$ C=O, 50.31, 49.67, 45.69, 44.53 (—NCH$_2$—), 42.03 (—NCH$_2$—, may be associated with $CO_2$ products), 37.60, 36.45, 35.42 (—NCH$_2$—), 23.81, 22.84, 22.14, 20.60 (—NCH$_2$CH$_2$—).

Comparative Example C3

Liquid Phase $CO_2$ Adsorption Using an Aqueous Solution of Poly(Aziridine)

A procedure similar to that carried out in Example 9 was performed using a 2.69 wt % $D_2O$ solution of commercial poly(aziridine) (Aldrich Chemical Co. polyethyleneimine 40, 872-7, nominal M$_n$~10,000). $^{13}C$ NMR of the starting poly(aziridine) (24° C., $D_2O$, 400 MHz, no calibrant, shown in FIG. 8 along with $^1H$ NMR; 25 wt % sample prepared and measured at 24° C. in a 5 mm NMR tube as described in Example 5): δ 56.11 (tertiary amine NCH$_2$— next to primary amine), 53.11 (tertiary amine NCH$_2$— next to secondary amine), 51.00 (tertiary amine NCH$_2$— next to tertiary amine), 50.78 (secondary amine NHCH$_2$— next to primary amine, overlapped with previous peak; the amount of integral assumed to derive from the secondary amine peak in the total was set equal to that of the related peak at 39.86), 47.65 (secondary amine NHCH$_2$— next to secondary amine), 45.54 (secondary amine NHCH$_2$— next to tertiary amine, 39.86 (primary amine H$_2$NCH$_2$-next to secondary amine), 37.78 (primary amine H$_2$NCH$_2$— next to tertiary amine). The ratio of primary:secondary:tertiary amines was 30.4:39.9:29.7. After a 7 hour period of $CO_2$ bubbling, the $^{13}C$ NMR spectrum (as shown in FIG. 8 hereof, acquired similarly to that in Example 9) indicated formation of the same kinds of products seen in Example 9 hereof with molar loadings of 24.7% carbamate, 23.4% (bi)carbonate, and 4.2% physisorbed $CO_2$ were obtained (overall 53.2 mol % loading, 54.5 wt % loading of polymer weight, 29.1 wt % of combined polymer+$CO_2$ weight). $^{13}C$ NMR (30° C., 100 MHz, 60 second repetition delay, no calibrant): δ 164.14 (br, carbamate C=O, 12.3% of polymer integral), 160.24 (bicarbonate and/or carbonate C=O in fast equilibrium, 11.7% of polymer integral), 124.67 (physisorbed $CO_2$ C=O, 2.1% of polymer integral), 50.06, 44.62, 38.81, 37.64, 36.61, 35.43 (polymer —$NCH_2$—).

What is claimed is:

1. A functionalized adsorbent material for adsorbing $CO_2$ from $CO_2$-containing gaseous streams, which adsorbent material comprises a mesoporous silica having at least a portion of its pores functionalized with in-situ polymerized cyclic amine in which the density of amine sites of the in-situ polymerized cyclic amine is below 20.0 mmol amine/gram.

2. The functionalized adsorbent material of claim 1 wherein the density of amine sites of the in-situ polymerized cyclic amine is from about 16.5 to about 19.0 mmol amine/gram.

3. The functionalized adsorbent material of claim 1 wherein the cyclic amine of the in-situ polymerized cyclic amine is azetidine and the resulting in-situ polymerized cyclic amine is poly(azetidine).

4. The functionalized adsorbent material of claim 1 wherein the in-situ polymerized cyclic amine has a branched structure and contains primary, secondary, and tertiary amine sites.

5. The functionalized adsorbent material of claim 4 wherein the ratios of primary:secondary:tertiary amines in the in-situ polymerized cyclic amine ranges from between about 2:96:2 to about 46:8:46.

6. The functionalized adsorbent material of claim 1 wherein the functionalized adsorbent material has a BET surface area from about 100 $m^2/g$ to about 1500 $m^2/g$, and a pore volume from about 0.3 cc/g to about 1.8 cc/g.

7. The functionalized adsorbent material of claim 1 further comprising one or more additional components selected from the group consisting of amorphous silica binder, aluminum oxide binder, residual polymerization solvent, and residual polymerization initiator.

* * * * *